(12) United States Patent
Nakamura et al.

(10) Patent No.: US 7,593,055 B2
(45) Date of Patent: Sep. 22, 2009

(54) CAMERA SYSTEM, CAMERA MAIN BODY, AND CAMERA HEAD

(75) Inventors: Satoshi Nakamura, Saitama (JP); Yukihiro Kawada, Saitama (JP)

(73) Assignee: FUJIFILM Corporation, Kanagawa (JP)

( * ) Notice: Subject to any disclaimer, the term of this patent is extended or adjusted under 35 U.S.C. 154(b) by 632 days.

(21) Appl. No.: 11/188,638

(22) Filed: Jul. 26, 2005

(65) Prior Publication Data
US 2006/0023070 A1 Feb. 2, 2006

(30) Foreign Application Priority Data

Jul. 27, 2004 (JP) ............... 2004-218657
Sep. 28, 2004 (JP) ............... 2004-282168

(51) Int. Cl.
H04N 5/225 (2006.01)
H04N 5/232 (2006.01)

(52) U.S. Cl. .................. 348/360; 348/211.99; 348/375

(58) Field of Classification Search ............. 348/231.7, 348/207.99, 340, 211.14, 360, 361, 211.99, 348/211.2, 333.07, 335, 211.3, 375, 45; 396/54
See application file for complete search history.

(56) References Cited

U.S. PATENT DOCUMENTS

| 5,640,623 | A  | * | 6/1997  | Sasaki ............... 396/180 |
| 6,101,339 | A  | * | 8/2000  | Miki et al. .......... 396/301 |
| 6,404,987 | B1 | * | 6/2002  | Fukui ................ 396/56 |
| 7,133,077 | B2 | * | 11/2006 | Higuma et al. ....... 348/345 |
| 7,463,827 | B2 | * | 12/2008 | Horii et al. ........ 396/532 |
| 7,471,310 | B2 | * | 12/2008 | Amling et al. ....... 348/72 |
| 2002/0044206 | A1 | * | 4/2002  | Kyuma ............... 348/240 |
| 2004/0114044 | A1 | * | 6/2004  | McCurdy et al. ..... 348/207.99 |
| 2005/0212954 | A1 | * | 9/2005  | Senba et al. ........ 348/360 |
| 2005/0237420 | A1 | * | 10/2005 | Kokubun ............. 348/340 |
| 2006/0056049 | A1 | * | 3/2006  | Tokiwa et al. ....... 359/684 |
| 2007/0098385 | A1 | * | 5/2007  | Tanaka et al. ....... 396/56 |
| 2007/0126883 | A1 | * | 6/2007  | Ishige et al. ....... 348/211.14 |
| 2007/0147815 | A1 | * | 6/2007  | Tanaka .............. 396/56 |

FOREIGN PATENT DOCUMENTS

| JP | 8-172561 A    | 7/1996 |
| JP | 2000-175089 A | 6/2000 |
| JP | 2002-107787 A | 4/2002 |
| JP | 2002-152576 A | 5/2002 |
| JP | 2003-121913 A | 4/2003 |
| JP | 2003121913 A  | * 4/2003 |
| JP | 2003-228115 A | 8/2003 |
| JP | 2003-319232 A | 11/2003 |

\* cited by examiner

*Primary Examiner*—Tuan V Ho
*Assistant Examiner*—Marly Camargo
(74) *Attorney, Agent, or Firm*—Sughrue Mion, PLLC

(57) ABSTRACT

In a connection check mode, a camera main body sends an electromagnetic wave signal to a lens unit to enable radio communication between the camera main body and the lens unit. Then the camera main body sends its own specification data to the lens unit through the radio communication, and the lens unit judges based on the specification data as to whether the lens unit is compatible with the camera main body or not. If the answer is yes, the lens unit derives from the specification data of the camera main body data on performances of the lens unit achievable in connection to the camera main body. The judgment and the performance data are sent through the radio communication to the camera main body, and are displayed as connection data on an LCD of the camera main body.

17 Claims, 20 Drawing Sheets

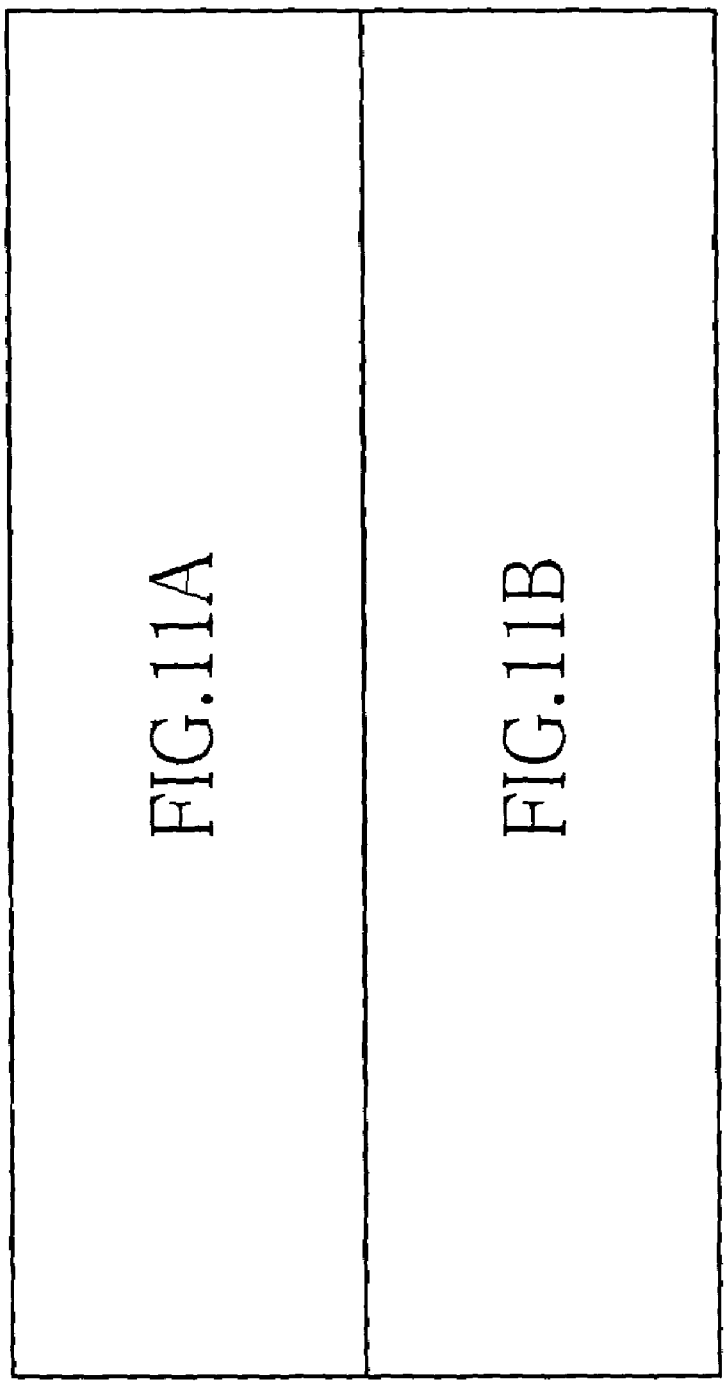

FIG.13A

| id | COMMUNICATION I/F | COMMUNICATION SPEED |
|---|---|---|
| 1 | HIGH-SPEED SERIAL | 200Mbps |
| 2 | HIGH-SPEED SERIAL | 400Mbps |
| 4 | HIGH-SPEED SERIAL | 600Mbps |

CAMERA BODY

FIG.13B

| id | COMMUNICATION I/F | COMMUNICATION SPEED |
|---|---|---|
| 1 | HIGH-SPEED SERIAL | 200Mbps |
| 2 | HIGH-SPEED SERIAL | 400Mbps |
| 4 | HIGH-SPEED SERIAL | 500Mbps |

CAMERA HEAD

| id | COMMUNICATION I/F | COMMUNICATION SPEED |
|----|-------------------|---------------------|
| 1  | HIGH-SPEED SERIAL | 200Mbps |
| 6  | HIGH-SPEED OPTICAL COMMUNICATION | 800Mbps |
| 7  | HIGH-SPEED OPTICAL COMMUNICATION | 1000Mbps |

CAMERA BODY

FIG.15B

| id | COMMUNICATION I/F | COMMUNICATION SPEED |
|----|-------------------|---------------------|
| 1  | HIGH-SPEED SERIAL | 200Mbps |
| 5  | HIGH-SPEED OPTICAL COMMUNICATION | 500Mbps |

CAMERA HEAD

CAMERA SYSTEM, CAMERA MAIN BODY, AND CAMERA HEAD

FIELD OF THE INVENTION

The present invention relates to a camera system consisting of a camera main body and attachments such as interchangeable lens units and flash units, each of which is removably attachable to the camera main body.

The present invention also relates to a camera head having an imaging optical system and an imaging device, a camera main body receiving image signals from the camera head when the camera head is removably attached to the camera main body, and a camera system consisting of the camera main body and the camera head.

BACKGROUND ARTS

Japanese Laid-open Patent Application No. 2002-107787 suggests a camera system which decides whether to activate a function to reduce the shaking or not in accordance with the lens unit as attached to the camera main body. Japanese Laid-open Patent Application No. 2003-121913 suggests a camera system where data on image distortion of a taking lens of the lens unit as attached to the camera main body is sent to the camera main body through a lens unit interface.

Such a camera system conventionally has a problem that it is difficult for beginners to see if an attachment is connectable to a camera main body, especially when the beginner wants to buy the attachment. It will be a great problem if a user has bought an attachment that is not connectable to a camera main body that the user already has. Furthermore, even for those skilled in photography who can see the compatibility of an attachment to a camera main body, i.e., the capability of connecting the attachment to the camera main body, it is difficult to see instantly and exactly how the attachment works in connection with the camera main body.

Japanese Laid-open Patent Application No. Hei 8-172561 suggests a camera system wherein a plug-in unit having an imaging device and an imaging optical system integrated therein is removably attachable to a camera main body. When the camera head is attached to the camera main body, data on the plug-in unit is transmitted to the camera main body, so as to enable capturing images as formed through the imaging optical system of the plug-in unit. According to this camera system, it becomes possible to change the imaging optical system, namely the taking lens, just by attaching the plug-in unit to the camera main body. So the camera system of this prior art can be very easy to handle, allowing unskilled photographers to interchange the taking lens without failure.

Same kinds of camera systems have been known for example from Japanese Laid-open Patent Application No. 2000-175089, wherein a camera head having an imaging optical system and an imaging device is removably attachable to a camera main body, which receives image signals from the attached camera head, to process the image signal.

These camera systems would meet any customer's needs if there are a wide variety of camera heads and a wide variety of camera main bodies that are compatible with any of those camera heads.

However, if there is any difference in electric configuration between the camera head and the camera main body, the camera head would not work in connection with the camera main body. To avoid this problem, a method of checking if an interchangeable lens is compatible with a camera main body with respect to their electric configurations has been suggested for example in Japanese Laid-open Patent Application No. 2003-228115, though the lens attachment mentioned in this prior art is not provided with an imaging device.

According to the method of this prior art, each time when any of a variety of interchangeable lens units is connected to any of a variety of camera main bodies, a controller of this camera main body checks if the electric configuration of the attached lens unit, such as output current and output voltage, fit the electric configuration of the camera main body, such as input current and input voltage.

The method suggested in the above prior art enables the controller of the camera main body to make judgment on whether the camera main body can execute suitable processing for the interchangeable lens that is attached to the camera main body.

Recently, such a camera system has been suggested that consists of a camera head having an imaging optical system and an imaging device and a camera main body, wherein image signals produced through the imaging device are transferred to the camera main body through image communication interfaces provided respectively in the camera head and the camera main body. The transferred image signals are processed in a signal processing section of the camera main body. In such a camera system, it is necessary to check if the image communication interface of the camera head is adaptable to the image communication interface of the camera main body. The camera system disclosed in the above mentioned Japanese Laid-open Patent Application No. 2003-228115 does not check the compatibility between the image communication interfaces of the camera head and the camera main body.

SUMMARY OF THE INVENTION

In view of the foregoing, a primary object of the present invention is to provide a camera system with a unit identifying device that judges on whether an attachment is compatible with a camera main body that a user already has.

Another object of the present invention is to provide a camera system consisting of at least camera head and at least a camera main body, wherein it is possible to check if the camera head has an image communication interface that is compatible with any of image communication interfaces of the camera main body.

To achieve the above objects, the present invention suggest a camera system that consists of at least a camera main body and interchangeable attachments that work in connection to the camera main body, wherein the attachments and the camera main body respectively comprise storage devices that store specification data on themselves, and radio communication devices that enable communication between the camera main body and the attachments even while the attachments are in packages; each of the attachments comprises a judging device for judging as to whether the attachment is connectable to the camera main body, based on the specification data on the camera main body received through the radio communication devices and the specification data of the attachment itself, and sends a judgment of the judging device to the camera main body through the radio communication devices; and the camera main body comprises an operation member for causing the radio communication devices to start radio communication, and a display device for displaying the judgment of the judging device.

According to a preferred embodiment, each of the attachments further comprises a device for deriving from the specification data performance data on performances of the attachment available in connection to the camera main body, when the judging device judges that the attachment is connectable to the camera main body, and sends the performance data along with the specification data to the camera main body through the radio communication devices; and the display device of the camera main body displays the performance data with the judgment.

The operation device is preferably a release button. The attachments include a lens unit having a taking lens mounted therein, or a flash unit having a flash device mounted therein.

The present invention also suggest a camera system that comprises an interchangeable camera head that is provided with an imaging optical system and an imaging device, and at least a camera main body, to which the camera head is removably attached, and which receives and processes image signals produced through the imaging device of the camera head, wherein the camera main body comprises a first body interface for receiving the image signals and a second body interface for communicating control signals, the first body interface establishing communication in one of at least an available communication format, the second body interface establishing communication in a fixed communication format; the camera head comprises a first head interface for sending the image signals and a second head interface for communicating the control signals, the first head interface establishing communication in one of at least an available communication format, the second head interface establishing communication in the same fixed communication format as the second interface of the camera main body; and the camera main body or the camera head comprises an interface setting device for detecting a common communication format among communication formats available to the first body interface and ones available to the first head interface by communicating data on these available communication formats between the camera main body and the camera head through the second body interface and the second head interface, and setting the common communication format at both of the first body interface and the first head interface.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein:

FIGS. 13A-B shows communication speeds available to a high-speed serial interface of the camera head and those available to a high-speed serial interface of the camera main body;

FIGS. 15A-B shows communication speeds available to the camera head and those available to the camera main body of FIG. 14;

DESCRIPTION OF THE PREFERRED EMBODIMENTS

Figure 1:
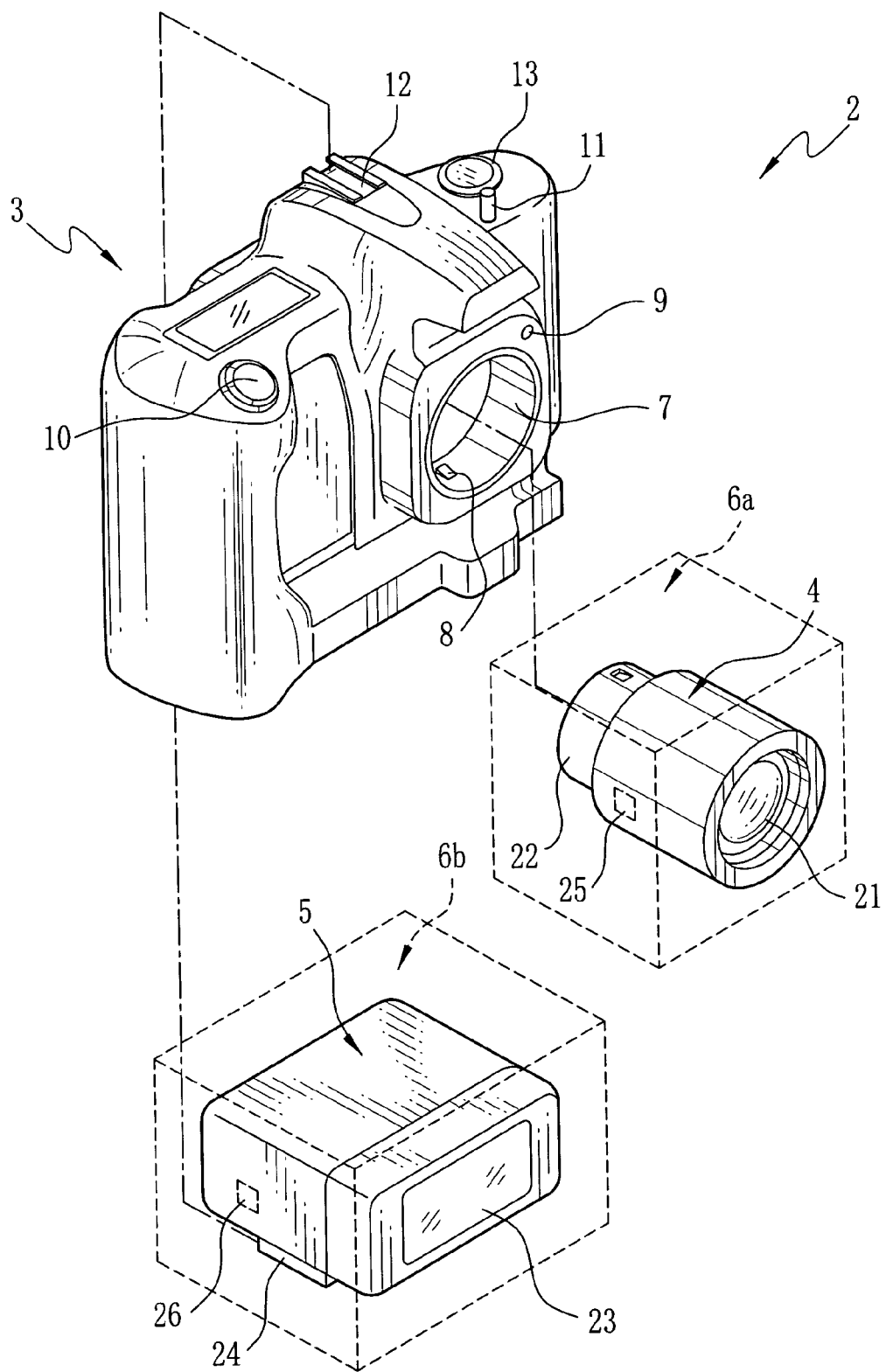
FIG. 1 is an explanatory diagram illustrating a camera system with a unit identifying device, according to an embodiment of the present invention.

FIG. 1 shows a camera system 2 having a unit identifying device. The camera system 2 consists of a camera main body 3, a lens unit 4 and a flash unit 5. The unit identifying device sends and receives specification data between the camera main body 3 and the lens unit 4 or between the camera main body 3 and the flash unit 5 even while the lens unit 4 and the flash unit 5 are packaged in containers 6a and 6b, in order to judge based on the specification data whether the lens unit 4 or the flash unit 5 is capable of being connected to the camera main body 3.

The camera main body 3 is provided with a lens mounting portion 7 on its front, for mounting the lens unit 4. The lens mounting portion 7 has claws 8 on its inner periphery. The claws 8 are force-fitted in a connecting portion 22 that is formed on a rear end of the lens unit 4. An unfastening button 9 is disposed near the lens mounting portion 7. Pressing the unfastening button 9 causes the claws to move radially outward to allow removal of the lens unit 4 from the lens mounting portion 7.

Figure 2:
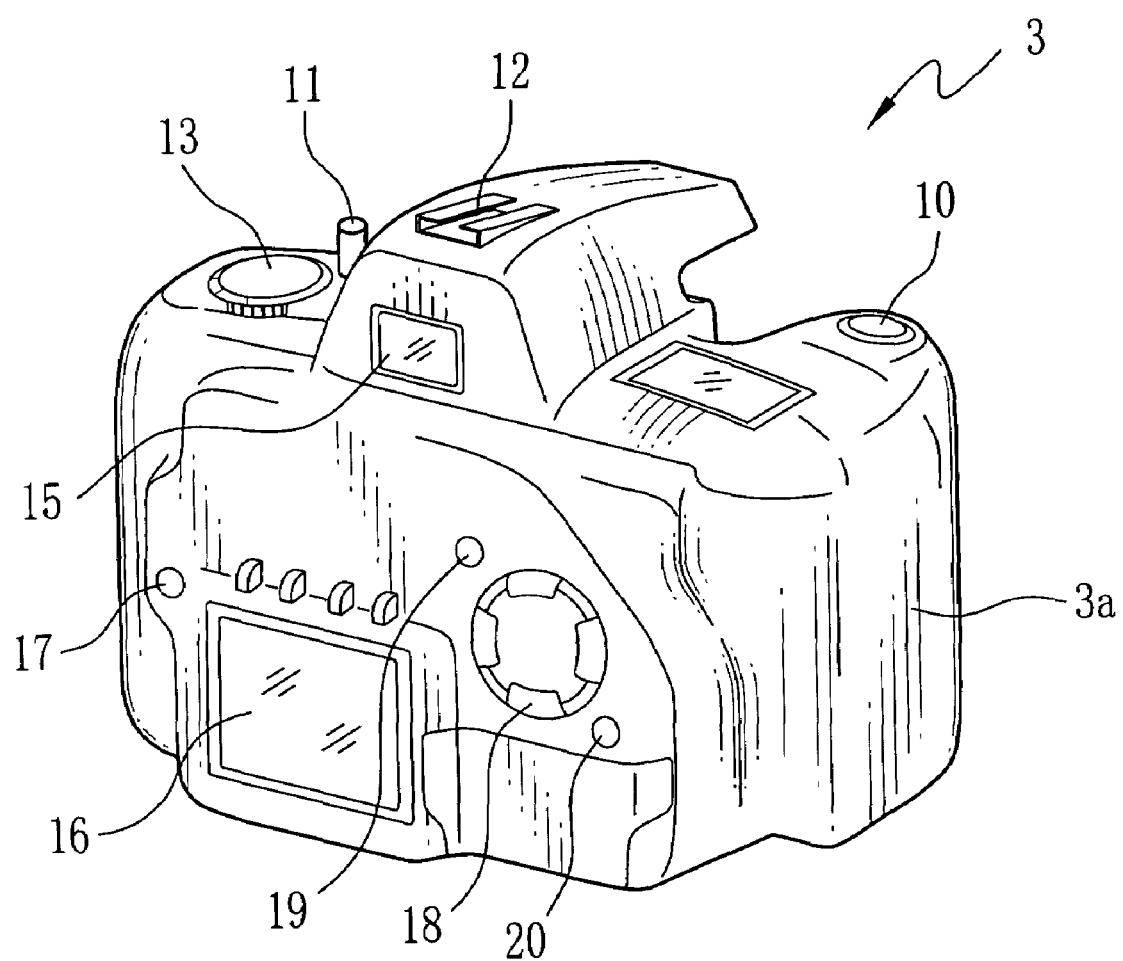
FIG. 2 is a rear perspective view of a digital camera constituting the camera system of FIG. 1.

The camera main body 3 is provided on its top side with a release button 10, an antenna 11, a flash attaching portion 12 for the flash unit 5, and a mode selection dial 13. The release button 10 is pressed to capture an image. The antenna 11 allows radio communication with the respective units 4 and 5. The mode selection dial 13 is for selecting one of different operation modes, including a capture mode for capturing images, a reproduction mode for displaying the captured images, a setup mode for setting up a variety of parameters, and a connection check mode for displaying connection data in a way as set forth later. According to the present embodiment, a sequence of processing for taking connection data is executed when the release button 10 is pressed for a predetermined time in the connection check mode. The lens unit 4 and the flash unit 5 are respectively provided with radio IC tags 25 and 26 for radio communication with the camera main body 3. As shown in FIG. 2, the camera main body 3 is also provided on its rear side with a finder eyepiece window 15, a liquid crystal display (LCD) panel 16 and a LCD switch 17 to turn the LCD panel 16 on or off.

Figure 3:
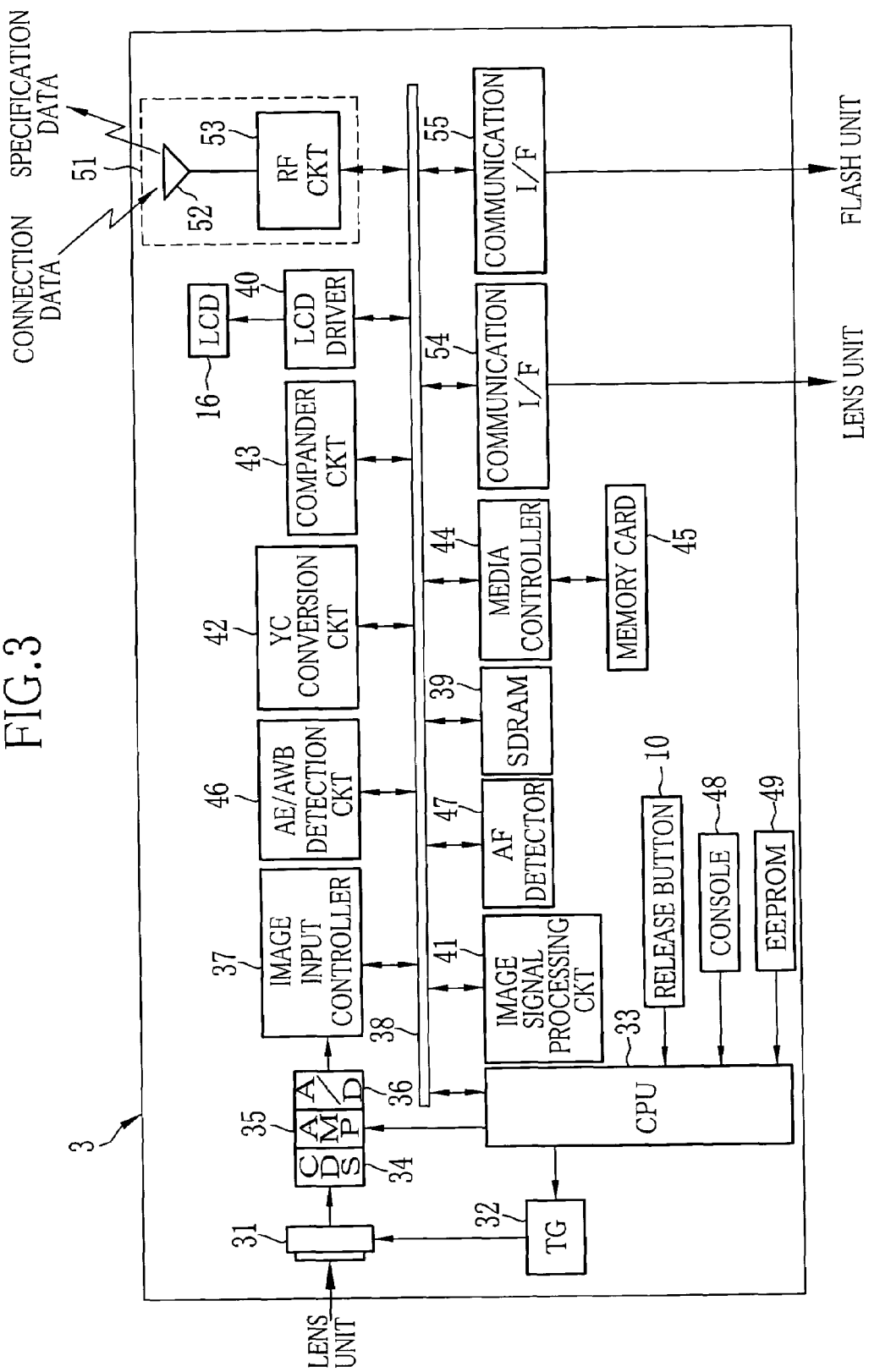
FIG. 3 is a block diagram illustrating an electric structure of the digital camera of FIG. 2.

FIG. 3 shows the circuitry of the camera main body 3. A CCD 31 is placed on an optical axis L1 of a taking lens of the lens unit 4 as it is attached to a camera main body 3a, so the CCD 31 can capture an optical image of a subject that is formed through the taking lens. The CCD 31 is connected to a timing generator (TG) 32 that is under the control of a CPU 33. The timing generator 32 outputs a timing signal or clock pulses to the CCD 31, to decide a shutter speed of an electronic shutter of the CCD 31.

The image signal output from the CCD 31 is sent to a correlated double sampling circuit (CDS) 34, which outputs image data of three primary colors (R, G, B) that exactly reflect volumes of electric charges accumulated in respective cells of the CCD 31. The image data output from the CDS 34 is amplified at an amplifier (AMP) 35 and is converted into a digital form through an A/D converter 36.

An image input controller 37 is connected to the CPU 33 through a data bus 38, so that the image input controller 41 controls the CCD 31, the CDS 34, the amplifier 35 and the A/D converter 36 in accordance with commands from the CPU 33. The image data from the A/D converter 35 is stored temporarily in a SDRAM 39, and is displayed on the LCD panel 16 through a LCD driver 40.

When the release button 10 is fully pressed down in the imaging mode, an image signal processing circuit 41 reads the image data out of the SDRAM 39, and processes it for gradation conversion, white-balance correction, gamma correction and the like. The processed image data is stored in the SDRAM 39 again. An YC conversion circuit 42 reads the processed image data from the SDRAM 39, and converts it into an illuminance signal Y and color difference signals Cr and Cb. A compander circuit 43 compresses the converted image data according to a predetermined compression format, e.g. JPEG format. The compressed image data is written on a memory card 45 by way of a media controller 44.

An AE/AWB (automatic exposure and white-balance control) circuit 46 is to determine as to whether a decided exposure amount, i.e. the electronic shutter speed, and an aperture size are proper or not. An AF (automatic focusing) detection circuit 47 detects as to whether the focus of the taking lens is proper or not. When the release button 10 is pressed halfway, the AE/AWB circuit 46 and the AF detection circuit 47 output the detection results to the CPU 33 through the data bus 38. Based on the detection results, the CPU 33 controls the taking lens and the aperture size of the lens unit 4, and the operation of the CCD 31 of the camera main body 3.

Besides the release button 10 and a console 48 including the mode selection dial 13 and other kinds of operation buttons 17 to 20, the CPU 33 is also connected to an EEPROM 49. The EEPROM 49 stores various control programs, setup data and specification data. The specification data is specifying the camera main body 3, and includes an identification number and a camera type number of the camera main body 3, respective control methods of the AE/AWB detection circuit 46 and the AF detection circuit 47 and a durable frame number of the memory card 45. The CPU 33 reads some of these data from the EEPROM 49, and writes them on the SDRAM 39 that serves as a work memory, thereby to perform necessary processing.

To the data bus 38 are connected also a communication interface (I/F) 54 for sending and receiving data to and from the lens unit 4, a communication I/F 55 for sending and receiving data to and from the flash unit 5, and a radio tag reader/writer (R/W) 51 for radio communication between the camera main body 3 and the respective units 4 and 5. The radio tag reader/writer 51 consists of an antenna 52 for sending and receiving electromagnetic signal waves to and from the radio IC tags 25 and 26 of the respective units 4 and 5, and a radio frequency (RF) circuit 53 for controlling sending and receiving of the electromagnetic signal waves at the antenna 52. The radio tag reader/writer 51 sends a first kind of electromagnetic wave to the respective units 4 and 5 even while they are packaged, in order to check the present radio communication conditions before starting the radio communication. When the radio IC tag 25 or 26 of the lens unit 4 or the flash unit 5 responds to the electromagnetic wave, the radio tag reader/writer 51 sends the responded radio tag 25 or 26 a second kind of electromagnetic wave that represent specification data of the camera main body 3 as stored in the EEPROM 49. When the radio tag reader/writer 51 receives any electromagnetic wave from the radio IC tag 25 or 26 of the unit 4 or 5, data represented by the received electromagnetic wave is stored in the SDRAM 39.

Figure 4:
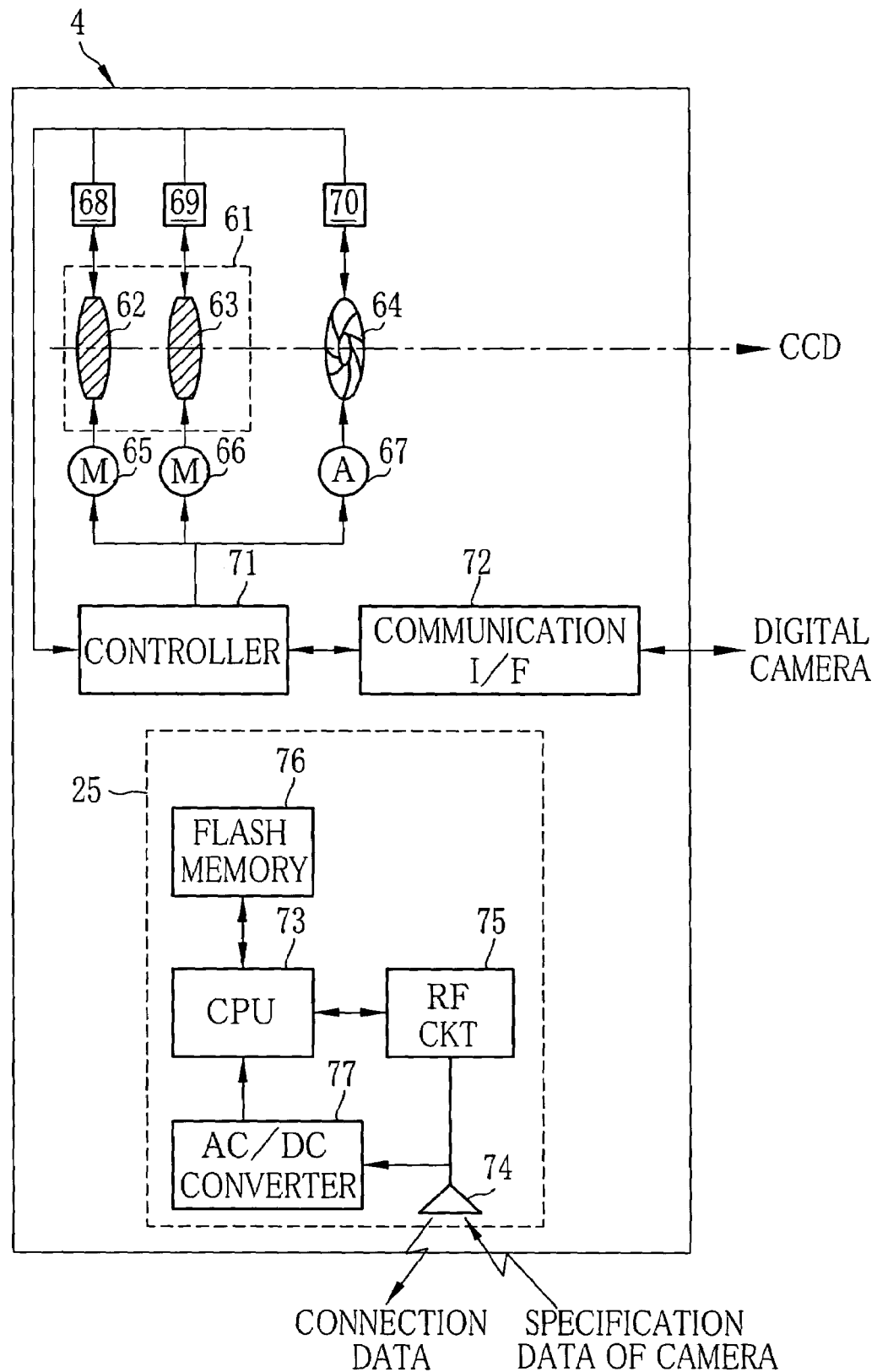
FIG. 4 is a block diagram illustrating an electric structure of a lens unit constituting the camera system of FIG. 1.

FIG. 4 shows the circuitry of the lens unit 4. The taking lens 61 consists of a zooming lens 62 and a focusing lens 63. A stop diaphragm 64 is disposed behind the focusing lens 63. These lenses 62 and 63 and the stop diaphragm 64 are driven by lens motors 65 and 66, and an iris motor 67 respectively. These motors 65 to 67 have respective driver circuits. Position detectors 68, 69 and 70 are disposed to detect respective positions of the zooming lens 62, the focusing lens 63 and the stop diaphragm 64, and feedback the detected positions to a controller 71.

The controller 71 is connected to the communication I/F 72 that sends and receives data to and from the camera main body 3. The controller 71 controls the motors 65 to 67 based on control signals from the camera main body 3, as received through the communication I/F 72 as well as the feedback values from the position detector 68 to 70.

The radio IC tag 25 is a non-contact micro IC memory that communicates data by way of electromagnetic waves in a well-known manner. The radio IC tag 25 is provided with an antenna 74 for sending and receiving electromagnetic signal waves to and from the radio tag reader/writer 51, a radio frequency (RF) circuit 75 for controlling sending and receiving of the electromagnetic signal waves at the antenna 74, a flash memory 76, an AC/DC converter 77 and a CPU 73 for controlling the respective components of the radio IC tag 25.

The flash memory 76 stores the specification data that specifies the lens unit 4. In this embodiment, the specification data consists of connection data list and performance data list. The connection data list shows camera type numbers connectable to the lens unit 4, whereas the performance data list shows an identification number of a type number of the lens unit 4, a zoom ratio of the taking lens 61, a method of automatic focusing (AF), a method of automatic zooming and so on. The flash memory 76 is a nonvolatile memory that does not need power supply for reserving the stored data. Electric power for activating the radio IC tag 25, one for reading data out from the flash memory 76, is supplied by converting the electromagnetic waves, which is sent from the radio tag reader/writer 51, into a carrier. Therefore, the radio IC tag 25 does not need any power source, that is, the radio IC tag 25 is a passive type tag.

Figure 5:
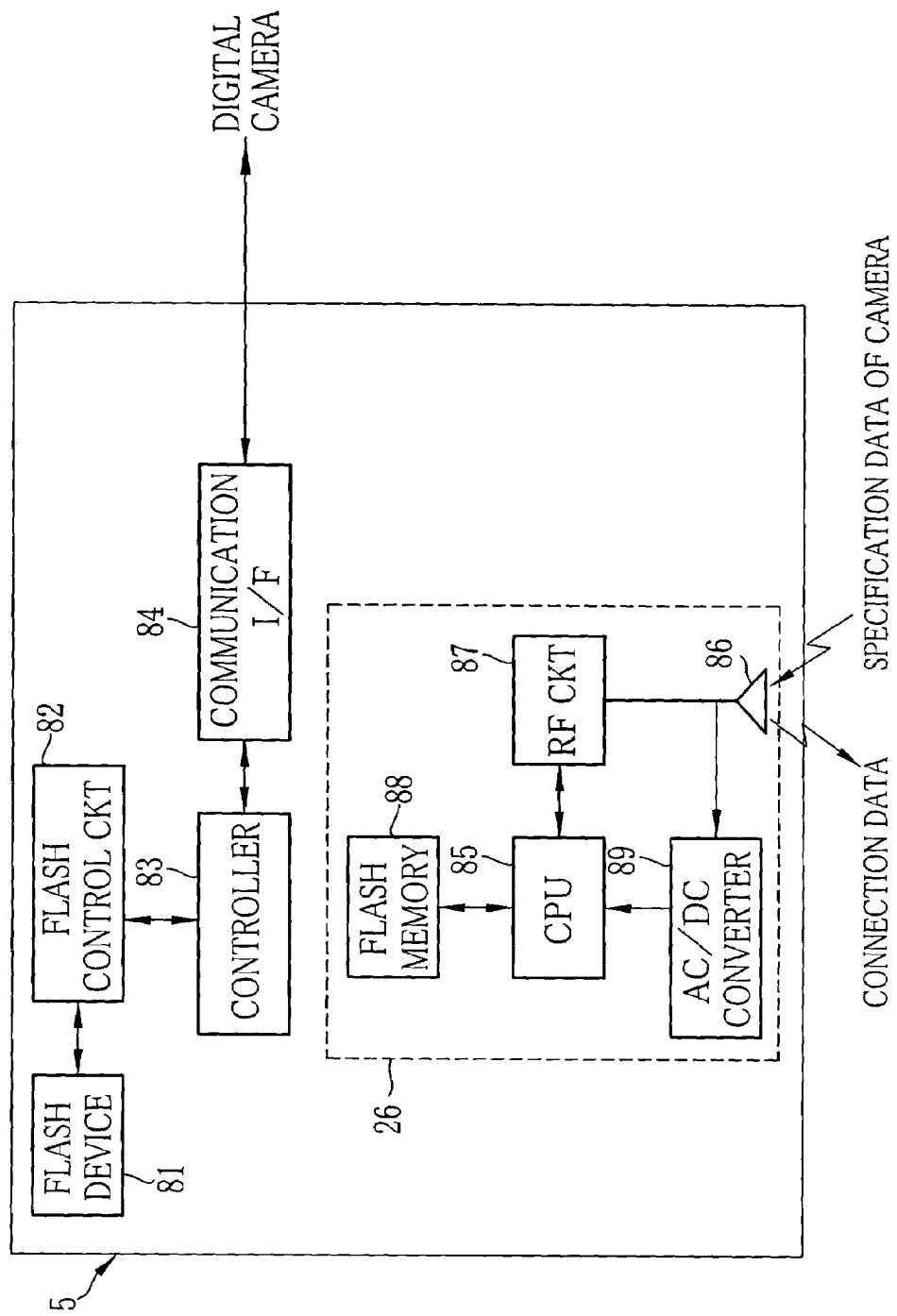
FIG. 5 is a block diagram illustrating an electric structure of a flash unit constituting the camera system of FIG. 1.

FIG. 5 shows the circuitry of the flash unit 5. The flash unit 5 is provided with a flash device 81, a flash control circuit 82, a controller 83, a communication I/F 84 and the radio IC tag 26. The controller 83 controls the operation of the flash device 81 through the flash control circuit 82 based on a control signal from the camera main body 3 that is received through the communication I/F 84.

The radio IC tag 26 consists of a CPU 85, an antenna 86, an RF circuit 87, a flash memory 88 and an AC/DC converter 89 in the same way as the radio IC tag 25 of the lens unit 4, except that the flash memory 88 stores different data from that of the flash memory 76.

The flash memory 88 stores the specification data that specifies the flash unit 5. In this embodiment, the specification data consists of connection data list and performance data list. The connection data list shows camera type numbers connectable to the flash unit 5, whereas the performance data list shows an identification number of a type number of the flash unit 5, a method of controlling the flash device 81, an available subject distance range, a method of automatic focusing, a power consumption value for a flash, and so on.

Now the operation of the radio IC tags 25 and 26 will be described, taking the radio IC tag 25 of the lens unit 4 for example. The radio IC tag 25 judges based on the received specification data of the camera main body 3 as to whether the lens unit 4 is connectable to the camera main body 3. For the judgment, the CPU 73 reads out the connection data list from the flash memory 76, and looks for the same camera type number as the type number of the camera main body 3. If there is the corresponding type number in the list, the camera main body 3 is judged to be connectable to the lens unit 4.

If the judgment is that the camera main body 3 is connectable to the lens unit 4, the CPU 73 derives based on the specification data of the camera main body 3 the performance data that represents performances of the lens unit 4 in connection with the camera main body 3. For this purpose, the CPU 73 reads out the performance data list from the flash memory 76, to determine how many of the listed performances can be effected in the camera main body 3. The results of this judgment is used as the performance data. The judgment on the capability of connection and the derived performance data are written as connection data on the flash memory 76, and also sent to the camera main body 3.

Figure 6:
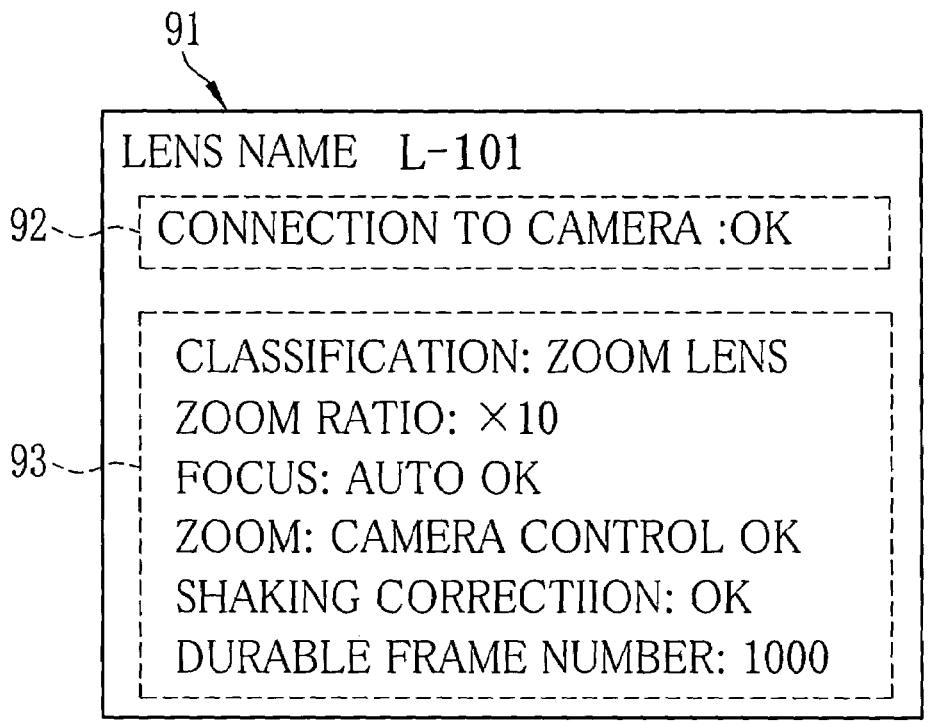
FIG. 6 is an explanatory diagram illustrating a screen showing connection data on the digital camera to the lens unit of FIG. 4.
Figure 7:
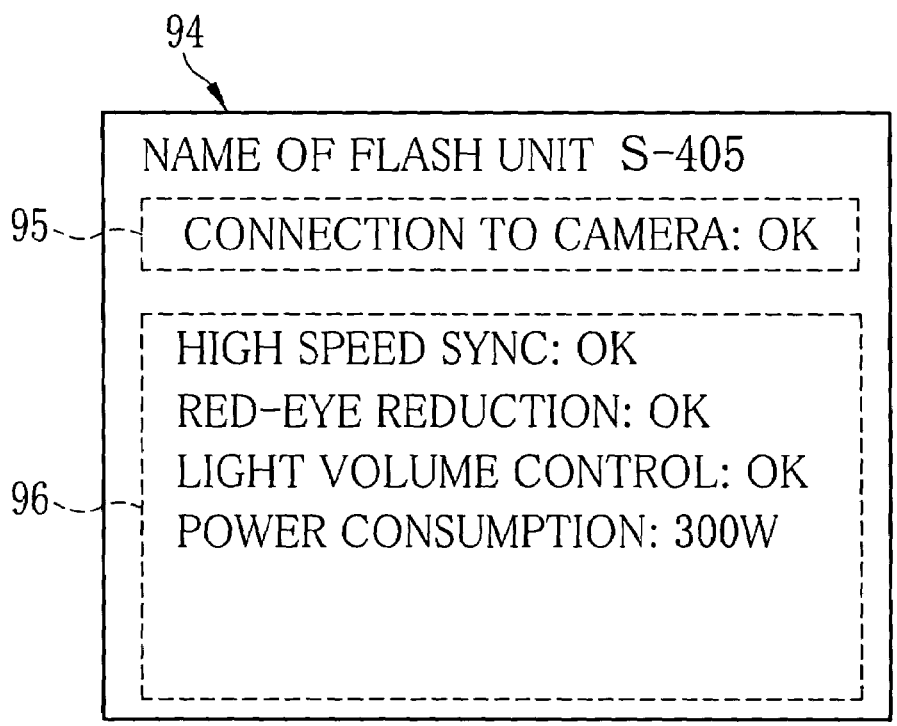
FIG. 7 is an explanatory diagram illustrating a screen showing connection data on the digital camera to the flash unit of FIG. 5.
Figure 8:
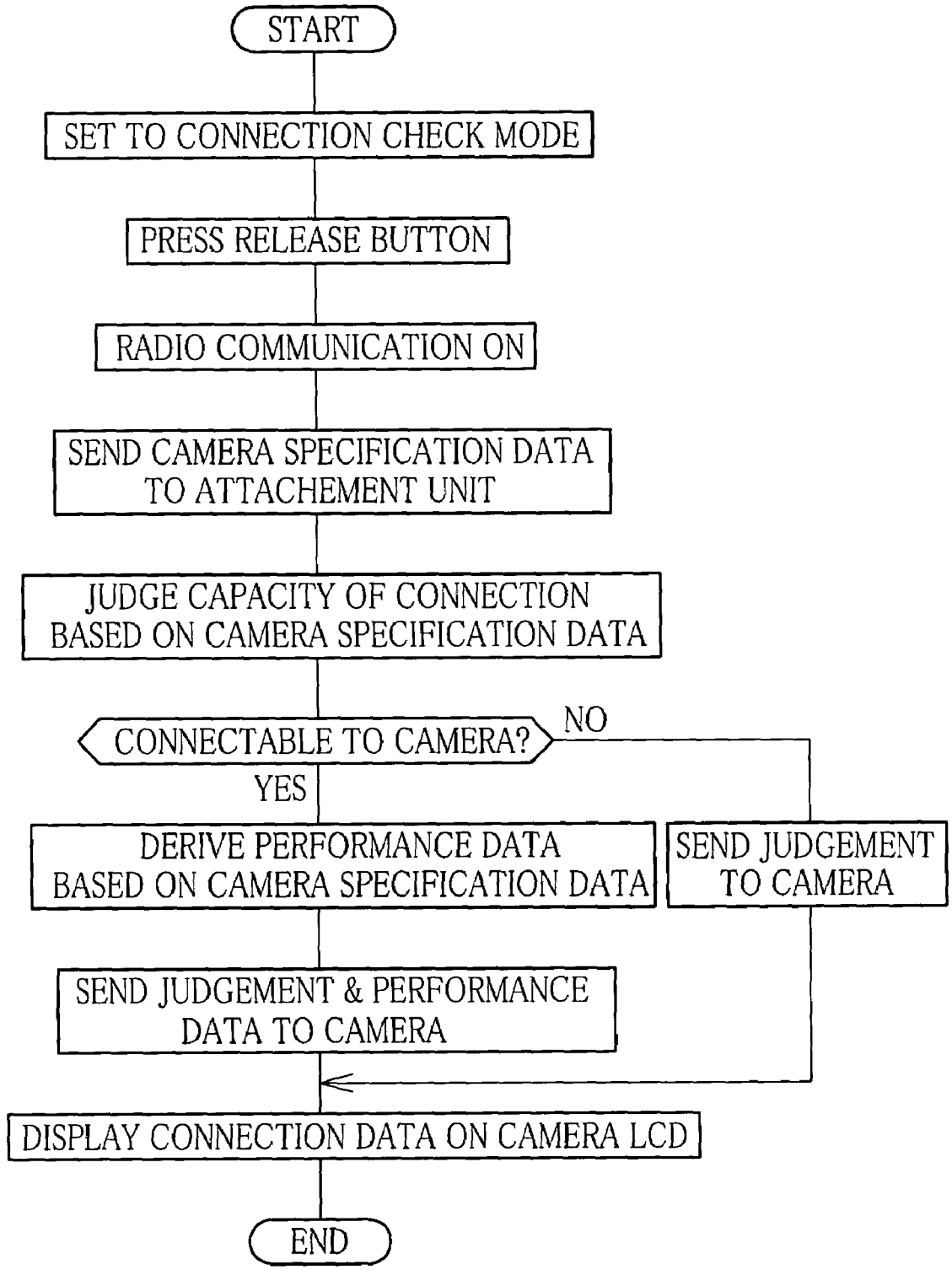
FIG. 8 is a flowchart illustrating the operation of the unit identifying device to get connection data.

As being received on the radio tag reader/writer 51, the connection data from the lens unit 4 is stored in the SDRAM 39 and, at the same time, displayed on the LCD 16 through the LCD driver 40. Then the LCD 16 displays a connection data screen 91 as shown for example in FIG. 6. In the same way, upon receipt of connection data from the flash unit 5, it is stored in the SDRAM 39 and displayed as a connection data screen 94 on the LCD 16 as shown for example in FIG. 7. The connection data screen 91 or 94 respectively shows the judgment 92 or 95 as to whether the lens unit 4 or the flash unit 5 is connectable to the camera main body 3, and the performance data 93 or 96 of the lens unit 4 or the flash unit 5 as connected to the camera main body 3.

The camera system consisting of the camera main body 3, the lens unit 4 and 5 works in combination as follows. When the release button 10 is pressed halfway, the CPU 33 generates control signals for automatic exposure and white-balance control (AE/AWB) and the automatic focusing (AF). The control signals is input in the lens unit 4 through the communication I/F 54. The motors 64 to 66 of the lens unit 4 are driven based on the control signals, to move the lenses 4a and 4b and the stop diaphragm 64 for focusing, zooming and controlling exposure. When the release button 10 is pressed to the full, the CPU 33 generates a control signal for flash control, and inputs it to the flash unit 5 through the communication I/F 84. Based on the control signal, the flash unit 5 emits a flash of light in synchronism with the exposure.

The unit identifying device of the camera system works as follows. When a user of the camera main body 3 wants to buy a lens unit, the user goes to a shop with the camera main body 3, to look for a lens unit that is compatible with the camera main body 3. First the camera main body 3 is switched to the connection check mode, and then the release button 10 is pressed for the predetermined time. Then the camera main body 3 sends out the electromagnetic wave to one of several lens units 4, letting the lens unit start radio communication. When the radio communication is available between the camera main body 3 and the lens unit 4, the camera main body 3 sends out its specification data to the lens unit 4. The lens unit 4 checks if the camera main body 3 is connectable to the lens unit 4. If it is judged that the camera main body 3 is connectable to the lens unit 4, performances of the lens unit 4 in connection with the camera main body 3 are derived based on the specification data of the camera main body 3. The judgment on the compatibility and data of derived performances of the camera main body 3 are transferred to the camera main body 3 through the radio communication, and are displayed as a connection data screen on the LCD 16, like one 91 shown in FIG. 6, so the user can see if the lens unit 4 is connectable to the camera main body 3. The connection data screen 91 also shows the performances of the lens unit 4 as connected to the camera main body 3 in the case where the lens unit 4 is connectable to the camera main body 3. To look for a flash unit compatible to the camera main body 3, data is exchanged through the radio communication in the same way as for the lens unit, and a connection data screen is displayed with respect to the flash unit, like one 94 shown in FIG. 7.

To start the radio communication, the release button 10 is pressed in the connection check mode in the above described embodiment. But it is possible to let the radio communication start in response to another operation. For example, another button is usable for starting the radio communication.

Although the lens unit 4 and the flash unit 5 are mentioned as interchangeable attachments to the camera main body 3, the camera system with the unit identifying device of the invention may include other kinds of units, such as a power source unit. Moreover, the present invention is applicable not only to digital camera systems but also to film camera system.

Figure 9:
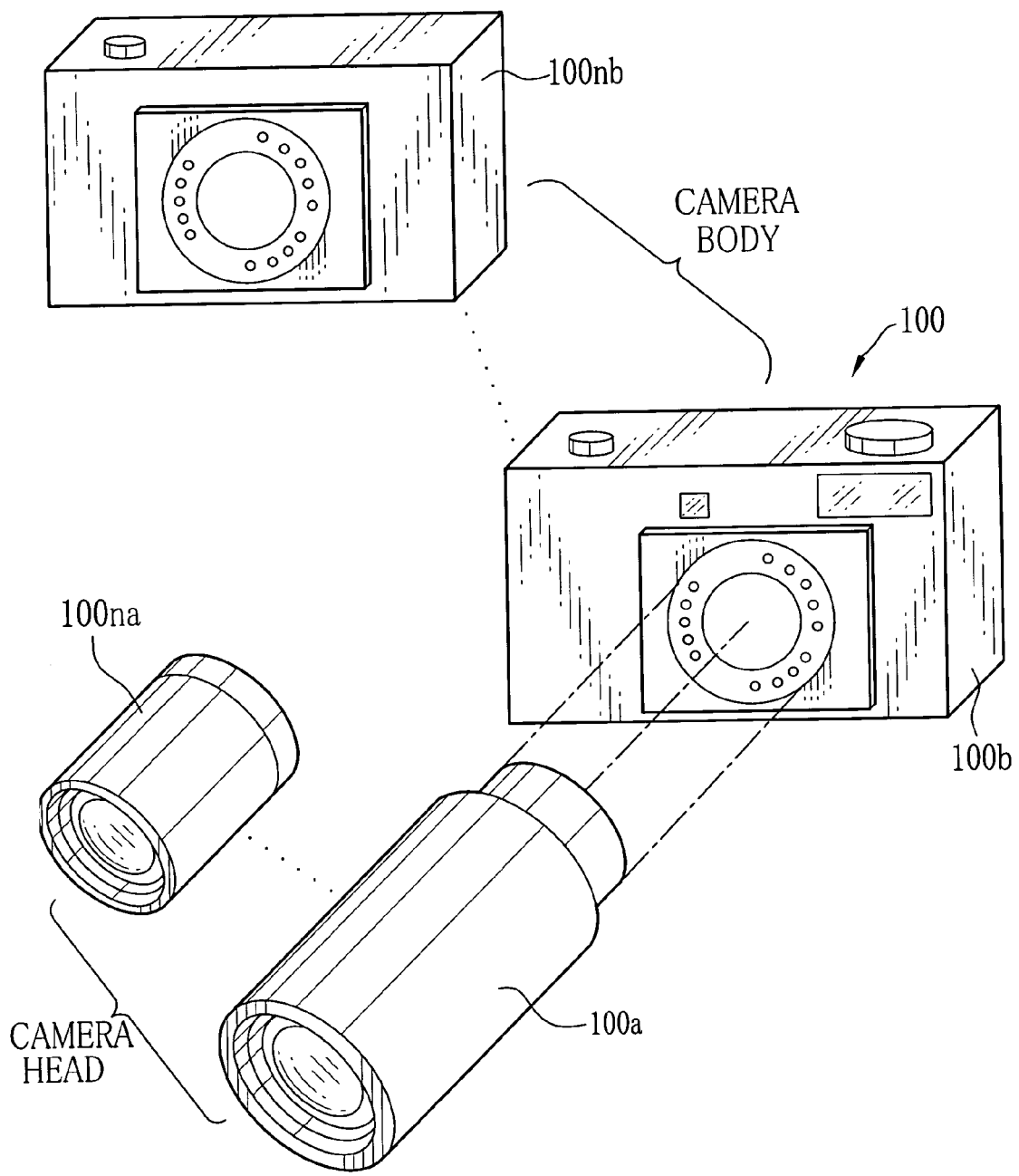
FIG. 9 is an explanatory diagram illustrating a camera system according to another embodiment of the present invention.

FIG. 9 shows a camera system according to another embodiment of the present invention. As shown in FIG. 9, the camera system is constituted of different kinds of camera heads 100a to 100na and different kinds of camera main bodies 100b to 100nb. Any of these camera heads 100a to 100na is interchangeably attached to any of these camera main bodies 100b to 100nb. The camera heads 100a to 100na are each provided with an imaging optical system and an imaging device. The camera main bodies 100b to 100nb process image signals received from attached ones of the camera heads 100a to 100na.

Figure 10:
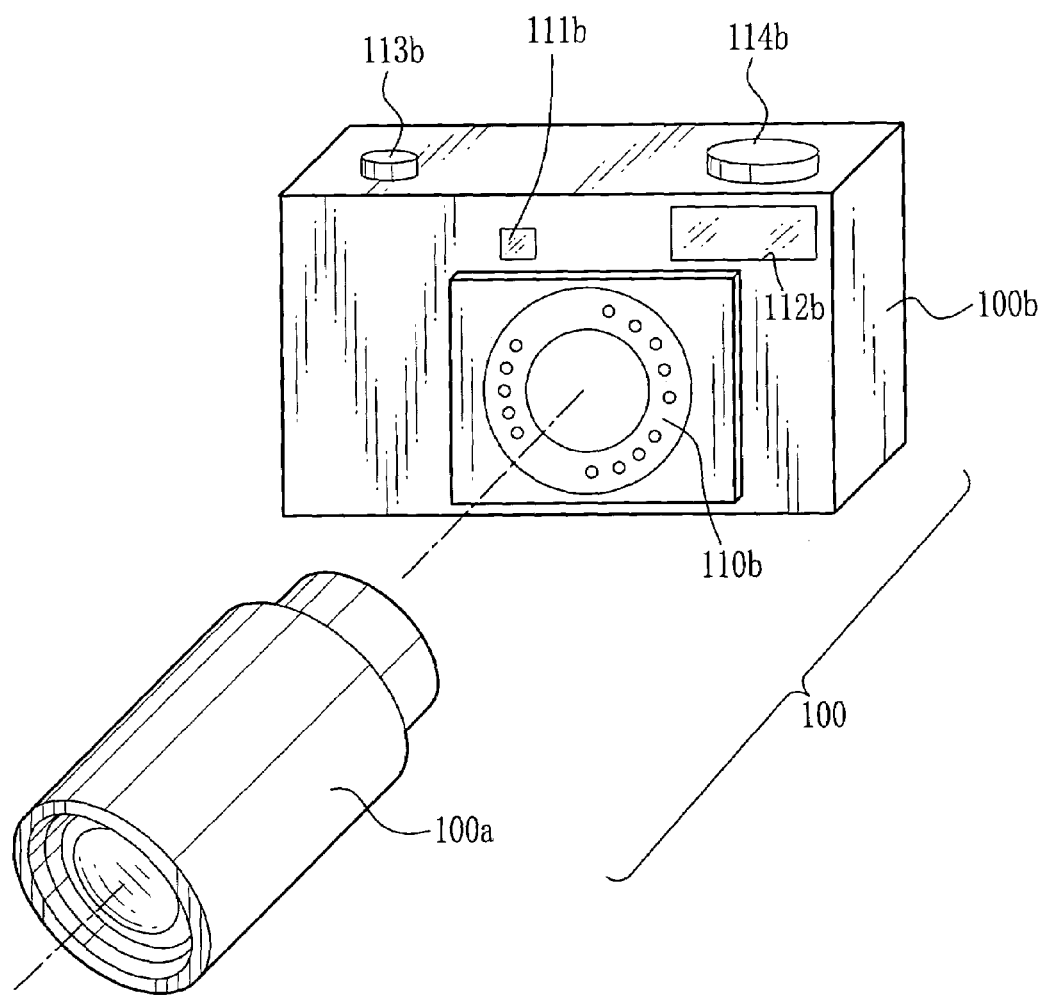
FIG. 10 is an explanatory diagram illustrating an example of the camera system, which is composed by attaching one of a plural kinds of camera heads to one of a plural kinds of camera main bodies.

FIG. 10 shows an example of camera system 100 consisting of one camera head 100a and one camera main body 100b. A head mounting portion 110b with a lot of mounting contacts is disposed in a front center of the camera main body 100b. The camera head 100a is also provided with the same mounting portion 110a having corresponding mounting contacts (see FIG. 11A). When the camera head 100a is attached to the camera main body 100b while connecting the mounting contacts of the mounting portion 110a to the mounting contacts of the mounting portion 111b, the camera head 100a is physically and electrically connected to the camera main body 100b. To keep the physical and electrical connection, a fastening mechanism 170b with an actuator 171b is provided inside the camera main body 100b (see FIG. 11A). The fastening mechanism 170b is actuated to fasten the camera head 100a to the camera main body 100b as the camera head 100a is attached to the camera main body 100b. To separate the camera head 100a from the camera main body 100b, an unfastening switch 172b is operated.

The camera main body 100b is loaded with batteries that supply power also to the camera head 100a through some of the mounting contacts of the camera head 100a and the camera main body 100b, which are used as power supply contacts. The mounting contacts also include those for communication, through which the camera main body 100b requests the camera head 100a to send data of the camera head 100a and image signals, and the camera head 100a sends data and image signals in response to the request from the camera main body 100b. The mounting contacts for communication include ones for control signals and ones for image signals in any kind of camera heads 100a to 100na as well as in any kind of camera main bodies 100b to 100nb. Although the contacts for communication are designed to have an identical shape regardless of whether they are for control signals or for image signals, the contacts for image signals have variety in communication format. For example, communication speed of one contact for image signal communication can differ from another, as set forth later. An AWB sensor 111b is disposed above the head mount 110b of the camera main body 100b, to detect what kind of light source is used for exposure. For example, the AWB sensor 111b determines whether the light source is the sun or fluorescent lights. Depending upon the light source detected by the AWB sensor 111b, a suitable color temperature is set in a digital signal processor of the camera main body 100b, to adjust white-balance to an optimum condition, as set forth later. A flash window 112b is disposed beside the AWB sensor 111b. Through the flash window 112b, a flash section 121b (see FIG. 11B) built in the camera main body 100b emits a flash of light under the control of a flash controller 120b. A release button 113b and a mode dial 114b are disposed on top side of the camera main body 100b. The mode dial 114b serves for choosing between an imaging mode and a reproduction mode, and for choosing between a still image capture mode and a movie capture mode in the imaging mode. According to the present embodiment, the mode dial 114b doubles as a power switch. Although they are not shown in the drawings operation members, like an arrow key and an OK button, are disposed on the back of the camera main body 100b.

Figure 11A:
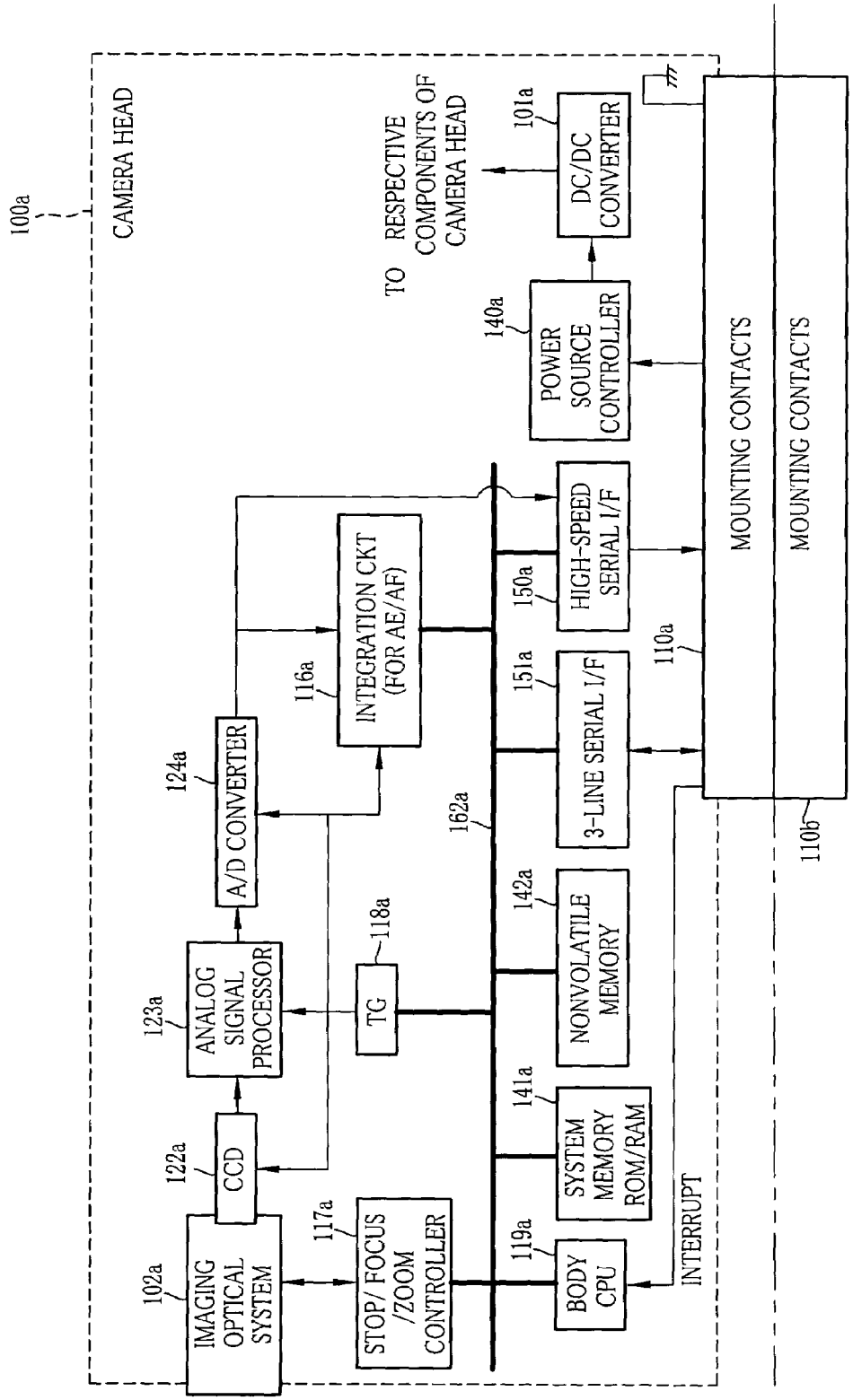
FIGS. 11A-B are block diagrams illustrating the interior of the camera head and the camera main body connected to each other to constitute the camera system of FIG. 10.
Figure 11B:
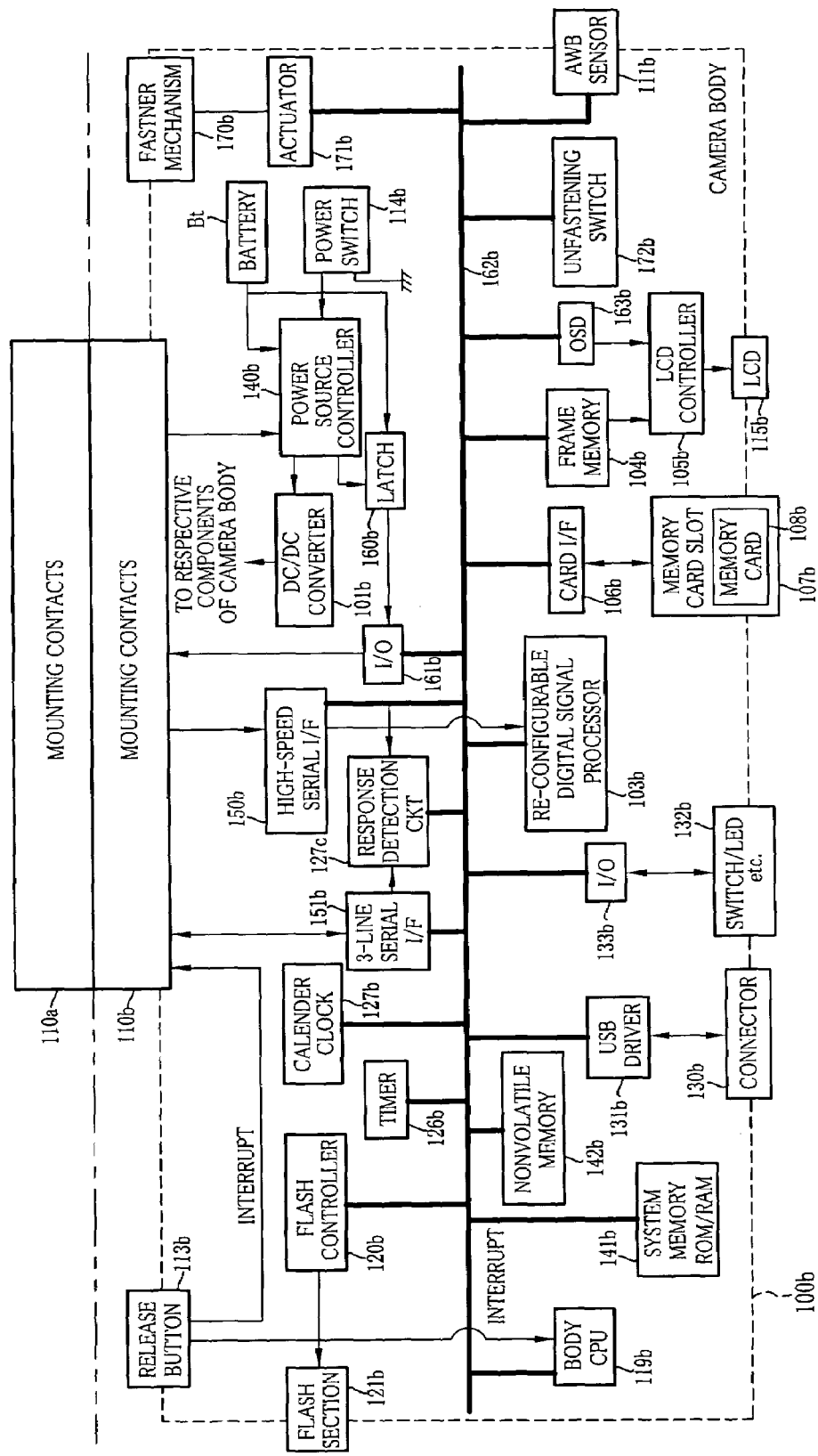

Now the interiors of the camera system consisting of the camera head 100a and 100b will be described with reference to FIGS. 11A and 11B.

DC/DC converters 110a and 101b of the camera head 100a and 100b are supplied from batteries Bt of the camera main body 100b, and are controlled respectively by power source controller 140a and 140b, which are disposed in the camera head 100a and 100b respectively.

When a command to supply power to the camera system is entered by operating the mode dial 114b, which doubles as the power switch, after the camera head 100a is connected to the camera main body 100b, the power source controller 140b of the camera main body 100b outputs the command to the DC/DC converter 101b to supply power from the batteries Bt to respective components of the camera main body 100b. Simultaneously, the command for power supply is transmitted through the power source controller 140b, a latch 160b and an I/O port 161b to the power source controller 140a of the camera head 100a. Then the power from the batteries Bt is supplied through the DC/DC converter 101a of the camera head 100a to respective components of the camera head 100a.

It is to be noted that the power source controller 140b of the camera main body 100b receives a low or grand level signal from the camera head 100a as the camera head 100a is attached to the camera main body 100b. Thereafter when the command for power supply is entered through the mode dial 114b, the power source controller 140b of the camera main body 100b switches over the latch 160b from the low level to a high level, or from the high to the low level. Then the latch 160b keeps that level and outputs a latch signal of that level to the I/O port 161b. Then the command for power supply is transmitted from I/O port 161b to the power source controller 140a of the camera head 100a. In other words, when the power switch 114b is turned on by operating the mode dial 114b that doubles as the power switch, the DC/DC converters 101a and 101b supply power to the respective components of the camera head 100a and 100b, to activate the whole camera system.

After the camera system is powered in this way, the camera system works to capture images in the following manner.

First the operation of the camera head 100a will be described. As shown in FIG. 3, the camera head 100a is provided with the imaging optical system 102a and the imaging device 122a that is a CCD solid state imaging device in this example. The imaging optical system 102a is constituted of a taking lens and a stop. Through the taking lens of the imaging optical system 102a, an optical image of a subject is formed on the CCD 122a, to produce analog image signals through the CCD 122a. The image signals are sent to an analog signal processor 123a, which processes the image signals for noise-reduction and the like. A timing generator 118a controls the timing of processing in the analog signal processor 123a. An A/D converter 124a converts the processed image signals into digital image data, and sends the image data to a high-speed serial interface (I/F) 150a. Through the high-speed serial I/F 150a and a high-speed serial I/F 150b of the camera main body 100b, the digital image data is sent to the camera main body 100b. The overall operation of the camera head 100a is controlled by a CPU 119a while referring to programs stored in a system memory section 141a, including a ROM and a RAM, and storing necessary data in a nonvolatile memory 142a.

Since the camera system is composed by attaching one of a variety of camera heads to one of a variety of camera main bodies, the camera main body does not instantly determine what kind of camera head is attached to it. According to the present embodiment, a CPU 119b of the camera main body 100b sends a request to the camera head 100a through a 3-line serial I/F 151b of the camera main body 100b and a 3-line serial I/F 151a of the camera head 100a, asking the camera head 100a to send back data on configuration of the CCD 122a and available communication formats of the camera head 100a, at the moment when the power switch 114b is turned on after the camera head 100a is attached to the camera main body 100b. As will be set forth in detail later, the camera head 100a sends back data on configuration of the CCD 122a and the communication formats of the camera head 100a in response to the request from the camera main body 100b, through and the 3-line serial I/F 151a and 151b. Then the CPU 119b of the camera main body 100b sets up communication speeds of the high-speed serial I/F 150a and 150b in accordance with the communication formats of the camera head 100a, or adapts a re-configurable digital signal processor 103b of the camera main body 100b to the configuration of the CCD 122a.

Regarding terms used for specifying the present invention, the high-speed serial I/F 150a and 150b correspond to the first head interface and the first body interface respectively, whereas the 3-line serial I/F 151a and 151b correspond to the second head interface and the second body interface respectively. The CPU 119b of the camera main body 100b corresponds to the interface setting device. According to the present embodiment, the CPU 119b of the camera main body 100b sets up not only the communication speed of the high-speed serial I/F 150b but also the communication speed of the high-speed serial I/F 150a of the camera head 100a.

After the communication speeds of the high-speed serial I/F 150a and 150b are set up by the body CPU 119b, the image data is supplied through the high-speed serial I/F 150a and 150b to the digital signal processor 103b of the camera main body 100b. The image data supplied to the camera main body 100b include those for camera-through images which serves for letting an LCD 115b (see FIG. 11B) of the camera main body 100b display the subject as being presently taken through the taking lens of the imaging optical system 102a during the imaging mode, those representative of a still image captured by operating the release button 113b while the still image capture mode is selected in the imaging mode, and those representative of a series of movie images captured by operating the release button 113b while the movie capture mode is selected in the imaging mode. Hereinafter, the image data for the camera-through images will be called the through-image signal, the image data of the still image will be called the still image signal, and the image data of the movie images will be called the movie image signal.

The signal image data is fed also to an integrating circuit 116a that is connected to an output of the A/D converter 124a. The integrating circuit 116a carries out automatic focusing (AF) and automatic exposure control (AE). Specifically, the integrating circuit 116a measures subject brightness for AE, and subject distance for AF. The subject brightness and the subject distance measured in the integrating circuit 116a are fed through a data bus 162a to a stop/focus/zoom controller 117a, so the stop/focus/zoom controller 117a adjusts the aperture size of the stop and the focus of the taking lens to the measured subject brightness and the subject distance. Thus, each time the subject changes in distance or brightness, the focus and the exposure value of the imaging optical system 102a are quickly controlled through the AE and AF functions, so the CCD 122a produces image signals that represent an optical image of a focused subject at an adequate exposure.

In this way, when the camera head 100a is attached to the camera main body 100b, the camera head 100a sends the configuration data of the CCD 122a and the communication formats of the camera head 100a to the camera main body 100b through the 3-line serial I/F 151a and 151b in response to the request from the camera main body 100b. Thereafter, the camera head 100a supplies the image data as produced through the CCD 122a, using the high-speed serial I/F 150a and 150b.

Next will be described how the camera main body 100b processes the image data from the camera head 100a.

The camera main body 100b is provided with the re-configurable digital signal processor 103b, which the CPU 119b of the camera main body 100b sets up the configuration data that is sent from the camera head 100a through the 3-line serial I/F 151a and 151b in response to the request that the camera main body 100b sends to the camera head 100a through the 3-line serial I/F 151a and 151b when the power switch 114b is turned on. Furthermore, according to the present embodiment, the body CPU 119b serves also as an interface setting portion to set up the communication speed of the high-speed serial I/F 150a of the camera head 100a as well as the communication speed of the high-speed serial I/F 150b of the camera main body 100b through the 3-line serial I/F 151b, so that the image data sent through the high-speed serial I/F 150a and 150b may be supplied to the re-configurable digital signal processor 103b in a shortest possible time.

The 3-line serial I/F 151a, which is the second interface of the camera head 100a, and the 3-line serial I/F 151b, which is the second interface of the camera main body 100b, have an identical communication format to each other in every camera body and every camera head of the camera system of the present invention. Therefore, whichever camera head is attached to whichever camera body, it is possible for the camera body to refer to the communication formats of the high-speed serial I/F as the first interface of the camera head, and the configuration of the imaging device of the camera head, by way of the 3-line serial I/F of both sides. If it is determined that a common communication format is usable for both of the high-speed serial I/F 150a and 150b, the body CPU 119b sets up the high-speed serial I/F 150a and 150b with the common communication format.

In this way, the camera main body 100b can receive the image signal in accordance with the communication format of the high-speed serial I/F 150a of the camera head 100a, and carry out signal processing in accordance with the configuration of the CCD 122a of the camera head 100a, enabling displaying the camera-through images as soon as the camera main body 100b is powered on.

Now the signal processing done on the image signals in the camera main body 100b will be described.

As described above, the camera head 100a sends any of the three kinds of image signals: the through image signals, the still image signals and the movie image signals. For example, when the through image signals are sent to the camera main body 100b, the through-image signals are processed in the re-configurable digital signal processor 103b, and then supplied through a frame memory 104b and a LCD controller 105b to the LCD 115b, so the LCD 115b displays camera-through images based on the through-image signals. The LCD controller 105b is also supplied with data from an OSD (On Screen Display) 163b, so the LCD 115b displays choice menus and the like as well as the camera-through images.

When the release button 113b is pressed while the camera-through images are being displayed, still image signals of a still image is supplied from the CCD 122a to the re-configurable digital signal processor 103b. The still image signals processed in the re-configurable digital signal processor 103b are sent to a card I/F 106b, and is written as compressed according to the JPEG format on a memory card 108b that is inserted in a memory card slot 107b. Also the movie image signals are processed in the re-configurable digital signal processor 103b, and are sent to the card I/F 106b, to be written as compressed according to the MPEG format on the memory card 108b. It is to be noted that the compression formats of the image signals are not to be limited to the present embodiment.

In this way, the image signals are sent through the high-speed serial I/F to the camera main body 100b in a short time, and the re-configurable digital signal processor 103b processes the image signals in accordance with the configuration of the CCD 122a of the camera head 100a.

Other components of the camera main body 100b are configured as follows:

Besides those components for the image signal processing, the camera main body 100b is provided with a timer 126b and a calendar clock 127b that produce data for displaying time and date on the LCD 115b through the OSD 163b, a response detection circuit 127c, an USB driver 131b and an USB connector 130b for connection to external apparatuses, and switches and LEDs 132b for entering operation commands and giving signals. The response detection circuit 127c detects a response from the camera head 100a. If the response detection circuit 127c does not detect the response in a given time, the camera main body 100b judges that the camera head 100a is out of order, and stops supplying the electric power to the camera head 100a. Commands entered through the switches 132b are supplied through an I/O port 133b to the body CPU 119b, so the body CPU 119b executes processing in accordance with the operation commands.

Because the release button 113b is directly connected to an interrupt terminal of the body CPU 119b and to an interrupt terminal of the head CPU 119a, both of the CPUs 119a and 119b interrupt their operation any time the release button 113b is pressed to the full, to start a still image processing program or a movie image processing program. The overall operation of the camera main body 100b is controlled by the body CPU 119b while referring to programs stored in a system memory section 141b, including a ROM and a RAM, and storing necessary data in a nonvolatile memory 142b.

Figure 12:
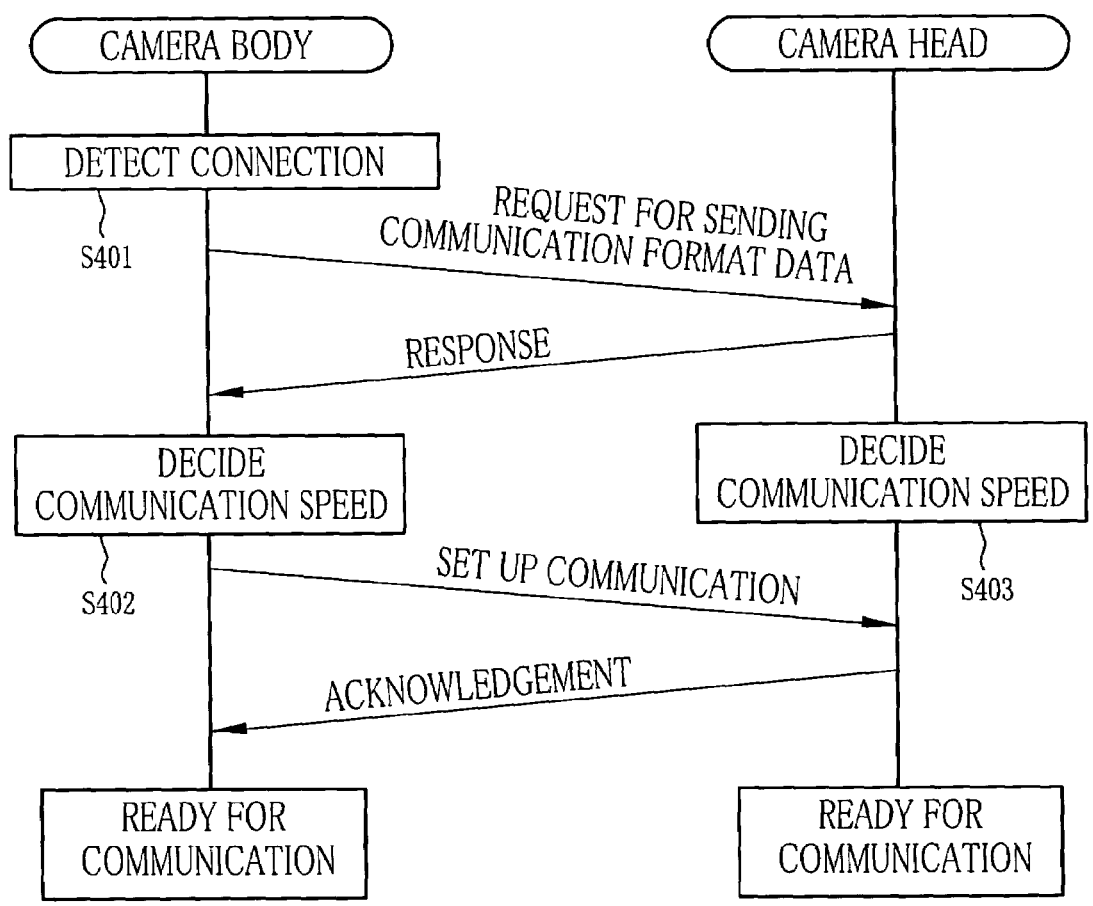
FIG. 12 is a flowchart illustrating a sequence of setting up image signal communication between the camera main body and the camera head under the control of a CPU of the camera main body.

As described above, the body CPU 119b works also as the interface setting portion. When to setup the high-speed serial I/F 150a and 150b of the attached camera head 100a and the camera main body 100b, the body CPU 119b refers to the communication formats of the high-speed serial I/F 150a and 150b of the attached camera head 100a and the camera main body 100b in the sequence as shown in FIG. 12.

Since the body CPU 119b works as the interface setting portion in the present embodiment, the body CPU 119b is assumed to refer to the communication format of the high speed serial I/F 150b of the camera main body 100b automatically when the camera main body 100b is powered on. So it is possible to set up a common communication format on both sides just by informing the camera main body 100b of the communication format of the high-speed I/F 150a of the camera head 100a.

Accordingly, the camera main body 100b detects that the camera head 100a is attached to the camera main body 100b (first step S401), and then sends the request for sending back the communication format of the high-speed serial I/F 150a from the camera head 100a through the 3-line serial I/F 151b and 151a. When data on the communication format of the high-speed serial I/F 150a is sent back through the 3-line serial I/F 151a and 151b in response to this request, the camera main body 100b compares the communication format of the high-speed serial I/F 150a of the camera head 100a with the communication format of the high-speed serial I/F 150b of the camera main body 100b, to decide the communication speed to be set at the high-speed serial I/F 150b (second step S402). Thereafter, the camera main body 100b sends the decided communication speed to the camera head 100a, to set it at the high-speed serial I/F 150a (third step S403). When the camera main body 100b receives a response or an acknowledgement (ACK) from the camera head 100a, informing that the communication speed setting is complete, both of the high-speed serial I/F 150a and 150b get ready for image signal communication.

FIG. 13A shows several options of communication speeds available to the high-speed serial I/F 150b of the camera main body 100b, and FIG. 13B shows several options of communication speeds available to the high-speed serial I/F 150a of the camera head 100a. In the examples shown in FIGS. 13A and 13B, the high-speed serial I/F 150a and 150b respectively have three available communication speeds. But, as described above, there are a variety of camera heads 100a to 100na and camera bodies 100b to 100nb, so the high-speed serial I/F 150a of one of these camera heads does not always have the same communication format as the high-speed serial I/F 150b of the camera main body 100b that is one of these camera bodies.

In this example, the high-speed serial I/F 150b of the camera main body 100b supports a low rate of 200 Mbps, a middle rate of 400 Mbps and a high rate of 600 Mbps. On the other hand, the high-speed serial I/F 150a of the camera head 100a supports a low rate of 200 Mbps, a middle rate of 400 Mbps and a high rate of 500 Mbps. In this case, the middle rate of 400 Mbps is set as the common communication speed to the high-speed serial I/F 150a and 150b. It is possible to use the low rate of 200 Mbps as the common communication speed, but the middle rate will speed image signal sending.

Although the camera head 100a and 100b support common communication speeds in the illustrated example, if there is not any common communication speed to the camera head 100a and 100b, the body CPU 119b judges that the camera head 100a is incompatible with the camera main body 100b, and shows the judgment.

As described so far, the CPU 119b of the camera main body 100b controls the 3-line serial I/F 151b and 151a to refer to the communication format of the high-speed serial I/F 150a of the attached interchangeable camera head 100a, to compare it with the communication format of the high-speed serial I/F 150b of the camera main body 100b, so it is possible to check the compatibility between the high-speed serial I/F 150b of the camera main body 100b and the high-speed serial I/F 150a of the camera head 100a.

Figure 14A:
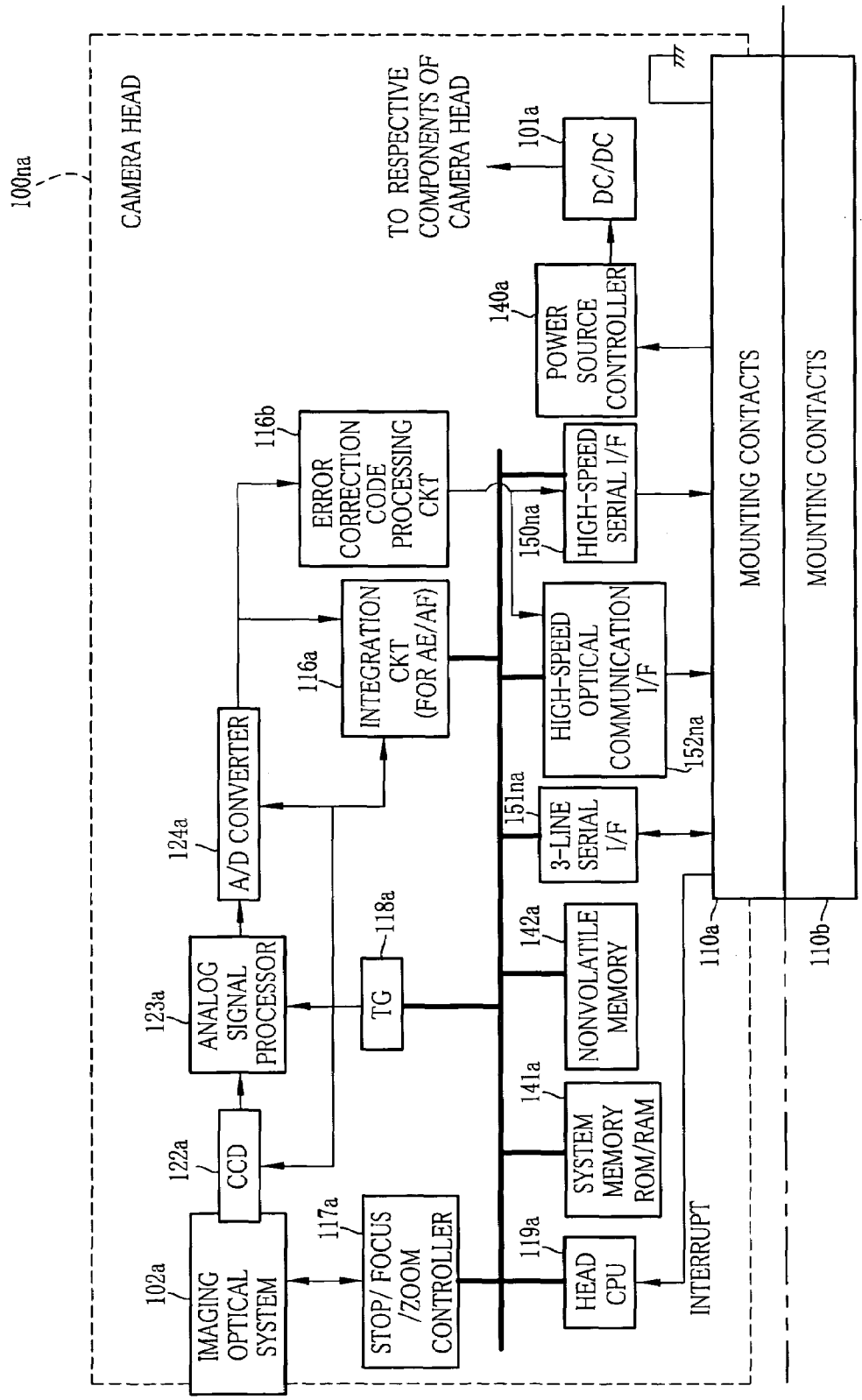
FIGS. 14A-B are block diagrams illustrating the interior of another couple of a camera head and a camera main body constituting of the camera system.
Figure 14B:
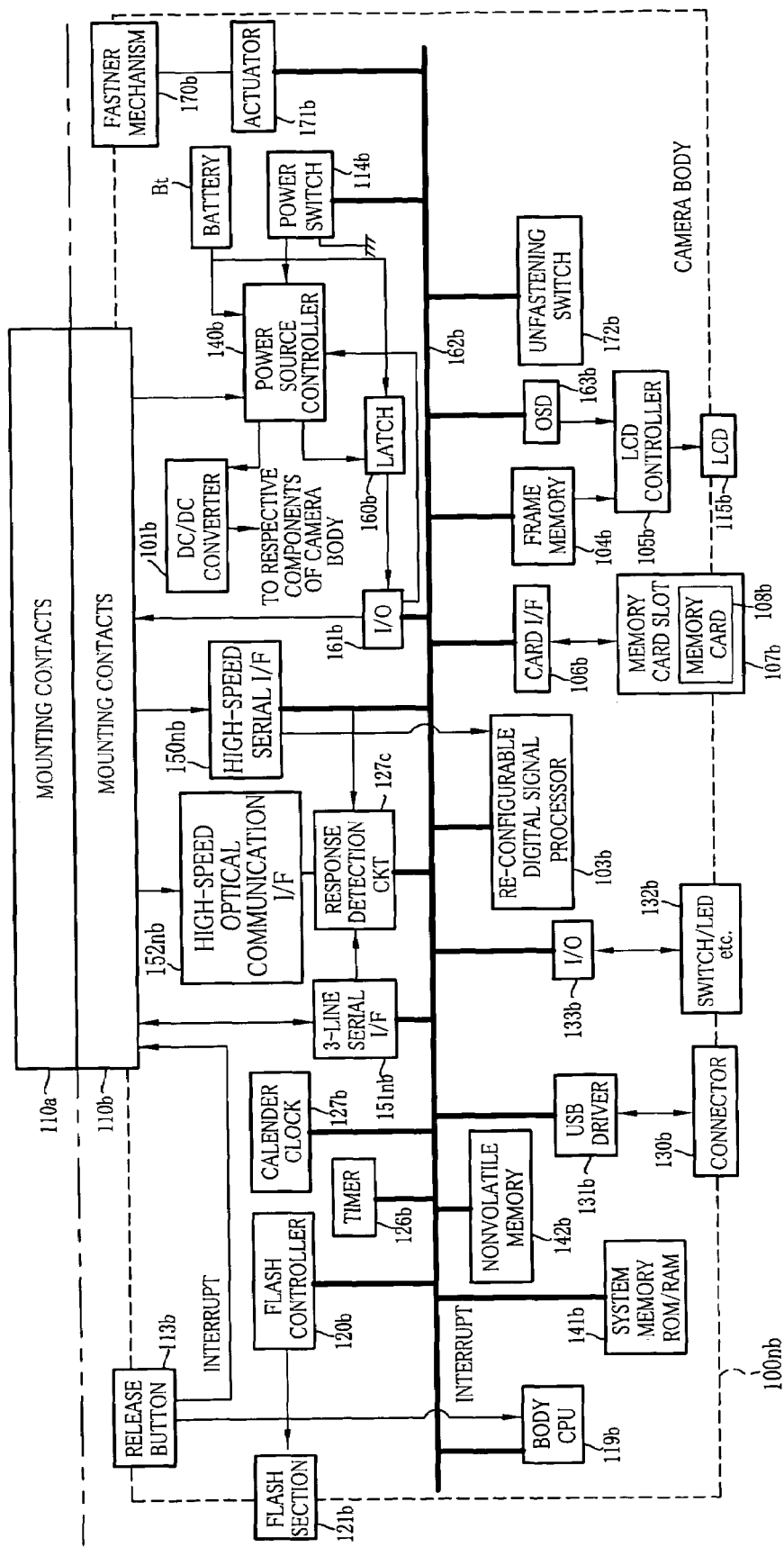

FIG. 14 shows a different couple of a camera body 100nb and a camera head 100na. As shown in this example, among the camera heads 100a to 100na of the camera system, there are ones that are provided with a high-speed optical communication I/F besides a high-speed serial I/F. Also among the camera bodies 100b to 100nb, there are ones that are provided with a high-speed optical communication I/F besides a high-speed serial I/F. If both the camera body 100nb and the camera head 100na have high-speed optical communication I/F 152nb and 152na beside high-speed serial I/F 150na and 150nb, it is preferable to use the optical communication I/F 152na and 152nb for the sake of speeding the communication.

In the embodiment shown in FIG. 14, a CPU 119na of the camera head 100a functions as the interface setting portion of the present invention. That is, the head CPU 119na leads the setting of the communication speed. Other components are substantially equivalent to the embodiment shown in FIGS. 11A and 11B, so like or equivalent components are designed by the same reference numerals, and the description of this embodiment relates only to those components essential to the embodiment of FIG. 14. An error correction code processing circuit 116b converts wrong codes into correctable codes.

FIG. 15A shows the communication formats available to the high-sped serial I/F 150nb and the optical communication I/F 152nb of the camera main body 100nb. FIG. 15B shows the communication formats of the high-sped serial I/F 150na and the optical communication I/F 152na of the camera head 100na. The high-speed serial I/F 150na and 150nb of the camera head 100na and the camera main body 100nb support a common communication speed of 200 Mbps, and the high-speed optical communication I/F 152nb of the camera main body 150nb supports communication speeds of 800 Mbps and 1000 Mbps, while the high-speed optical communication I/F 152na of the camera head 150na supports a communication speed of 500 Mbps.

Figure 16:
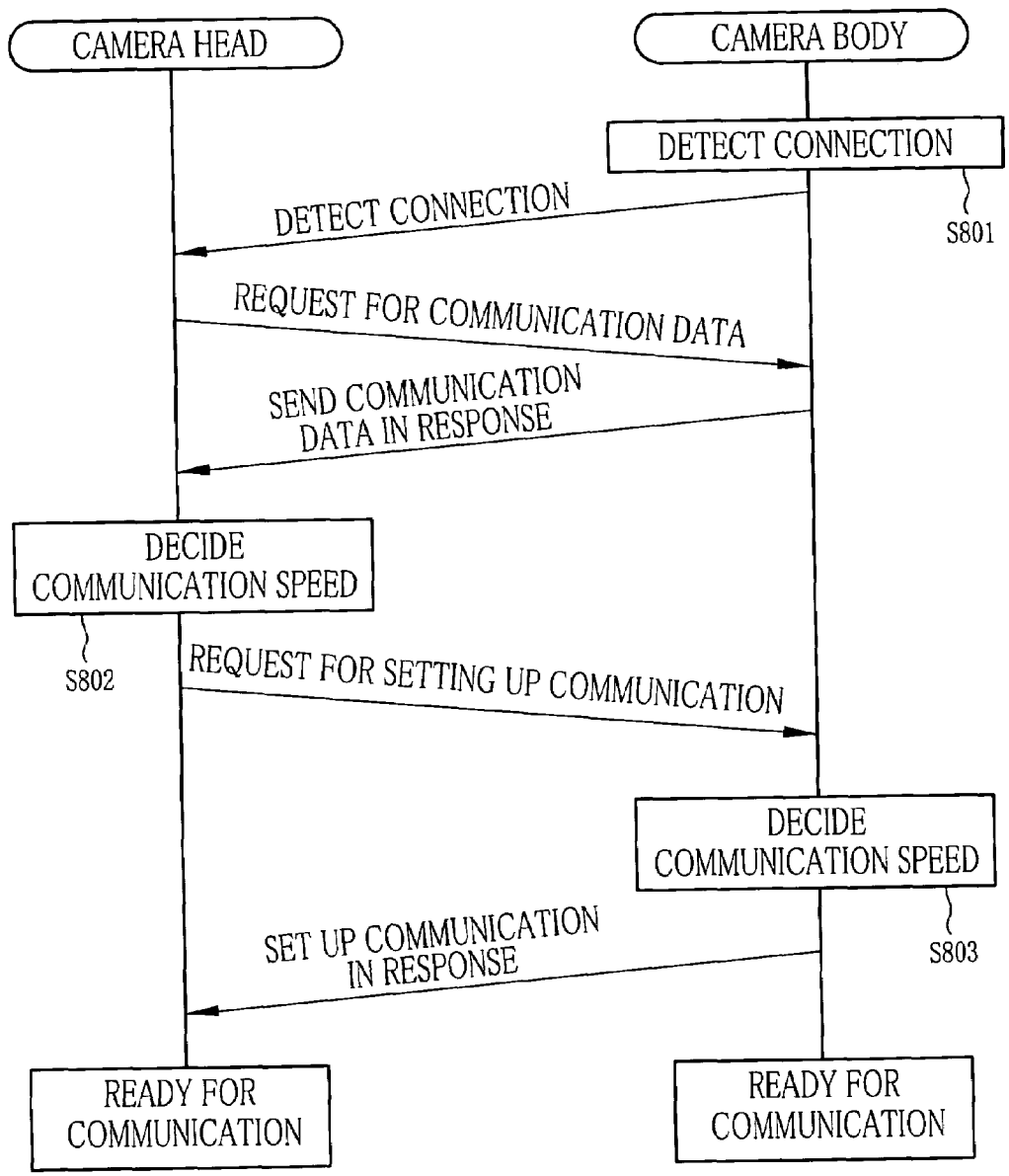
FIG. 16 is a flowchart illustrating a sequence of setting up image signal communication between a camera main body and a camera head under the control of a CPU of the camera head.

In another embodiment shown in FIG. 16, a power controller 140b of the camera main body 100nb detects that the camera head 10na is attached to the camera main body 100nb (S801). So the CPU 119na of the camera head 100na always inquires if the camera main body 100nb detects the connection of the camera head 100na to the camera main body 100nb, by use of 3-line serial I/F 151na and 151nb. Upon receipt of a response that the camera main body 100nb detects the connection of the camera head 10na, the head CPU 119na inquires communication formats of the camera main body 100nb through the 3-line serial I/F 151na and 151nb. When the camera main body 100nb sends back data on its own communication formats through the 3-line serial I/F 151na and 151nb, the head CPU 119na decides the communication speed of the camera head 100na with reference to the communication formats of the camera main body 100na (S802). Furthermore, the head CPU 119na sends the decided communication speed through the 3-line serial I/F 151na and 151nb to the camera main body 100nb, to set it at the camera main body 100nb.

In the present embodiment, since only the communication speed of 200 Mbps of the high-speed serial I/F 150na and 150nb is usable as a common communication speed for communicating image signals between the camera main body 100nb and the camera head 100na, the communication speed of 200 Mbps is set at the high-speed serial I/F 150na and 150nb of the camera head 100na and the camera main body 100nb. After the decided communication speed being set at the camera main body 100nb, a notification of completion of setting is sent from the camera main body 100nb to the camera head 100na. Then the camera main body 100nb and the camera head 100na get ready for communication.

In this way, the camera head can lead setting up communication interfaces of both sides while referring to the communication format of any camera main body.

Although the detection that the camera head is connected to the camera main body is carried out by the power source controller 140b of the camera main body 100nb in the embodiment shown in FIG. 16, it is possible to detect the connection on the side of the camera head.

Figure 17:
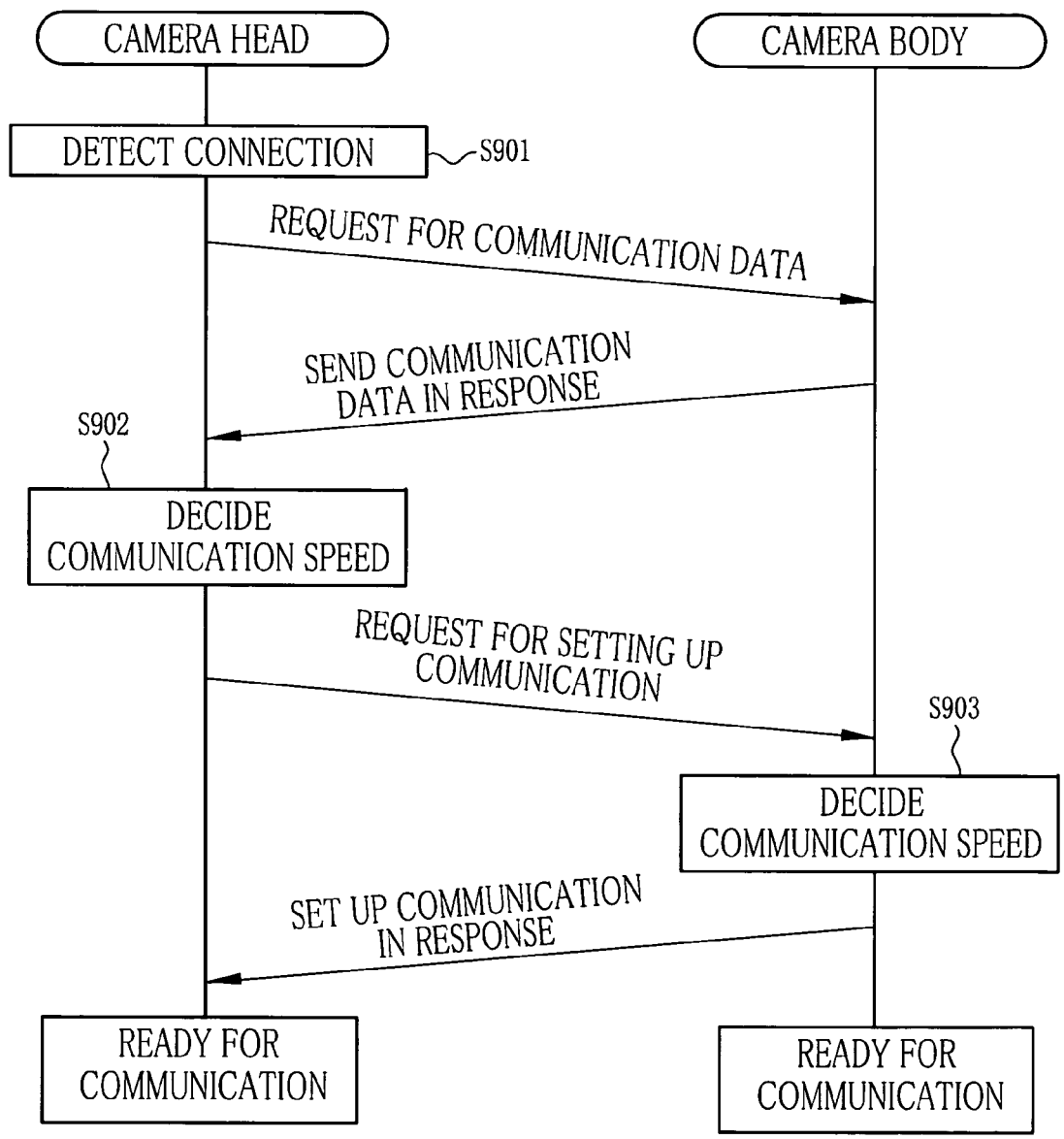
FIG. 17 is a flowchart illustrating a sequence of setting up image signal communication between a camera main body and a camera head under the control of a CPU of the camera head that can detect connection to the camera main body.

FIG. 17 shows a sequence of setting the communication speed in a case where the camera head is provided with a connection detecting device.

As obvious from the comparison with the sequence shown in FIG. 16, the sequence of FIG. 17 enables omitting a step of notifying the detection of connection from the camera main body to the camera head, because the camera head detects the connection. So this embodiment achieves rapider setting of communication interfaces at the time when the camera system is powered on. Therefore, if the imaging mode is chosen at that time, the camera main body begins to display the camera-through images in a shorter time.

Thus, the camera head can detect its connection to any of the camera main bodies, and then set up a common communication speed at the high-speed communication interfaces of both sides, by use of low-speed serial interfaces, i.e. 3-line serial I/F in the above embodiments.

As described so far, the present invention achieves a camera system that can check if any of communication interfaces of a camera head is compatible with any of communication interfaces of a camera main body, as the camera head is attached to the camera main body. The present invention also achieves a camera main body and a camera head, which constitute such a camera system.

Although the present invention has been described with respect the embodiments where there are a variety of camera main bodies and a variety of camera heads, so that one of the camera heads is attached to one of the camera main bodies, the present invention is not to be limited to the above embodiments. The present invention is applicable to those camera systems where a camera head is attachable to any of a variety of camera main bodies, where any of a variety of camera heads is attachable to a camera main body, or where a camera head is attached to a camera main body.

Thus, the present invention is not to be limited to the above embodiments but, on the contrary, various modifications will be possible without departing from the scope and spirit of claims appended hereto.

What is claimed is:

1. A camera system comprising at least a camera main body and interchangeable attachments that work in connection to said camera main body, wherein:
    said attachments and said camera main body respectively comprise storage devices that store specification data, of said attachments and said camera main body, and radio communication devices that enable communication between said camera main body and said attachments even while said attachments are in packages;
    each of said attachments comprises a judging device for judging as to whether said attachment is connectable to said camera main body, based on the specification data on said camera main body received through said radio communication devices and the specification data of said attachment itself, and sends a judgment of said judging device to said camera main body through said radio communication devices; and
    said camera main body comprises an operation member for causing said radio communication devices to start radio communication, and a display device for displaying the judgment of said judging device;
    wherein said specification data on said camera main body comprises a camera type number of said camera main body;
    wherein said specification data on said attachment comprises a connection data list including camera type numbers connectable to said attachment.

2. A camera system as claimed in claim 1, wherein:
    each of said attachments further comprises a device for deriving from said specification data performance data on performances of said attachment available in connection to said camera main body, when said judging device judges that said attachment is connectable to said camera main body, and sends the performance data along with the specification data to said camera main body through said radio communication devices; and
    said display device of said camera main body displays the performance data with the judgment.

3. A camera system as claimed in claim 1, wherein said operation device is a release button.

4. A camera system as claimed in claim 1, wherein said attachments include a lens unit having a taking, lens mounted therein, or a flash unit having a flash device mounted therein.

5. A camera system as claimed in claim 1, wherein said radio communication devices comprise radio integrated circuit tags provided in said attachments, and a radio tag reader/writer provided in said camera main body.

6. A camera system as claimed in claim 1, wherein the specification data comprises specification data of said camera main body that allows said camera main body to function with some lens barrels and does not allow said camera main body to function with other lens barrels.

7. A camera system as claimed in claim 1, wherein said judging device judges said attachment is connectable to said camera main body, if said camera type number of said camera main body is same as said camera type numbers connectable to said attachment in said connection data list.

8. A camera system comprising an interchangeable camera head that is provided with an imaging optical system and an imaging device, and at least a camera main body, to which said camera head is removably attached, and which receives and processes image signals produced through said imaging device of said camera head, wherein:

said camera main body comprises a first interface for receiving the image signals and a second interface for communicating control signals, said first interface establishing communication in one of at least an available communication format, said second interface establishing communication in a fixed communication format;

said camera head comprises a first interface for sending the image signals and a second interface for communicating the control signals, said first interface of said camera head establishing communication in one of at least an available communication format, said second interface of said camera head establishing communication in the same fixed communication format as said second interface of said camera main body; and said camera main body or said camera head comprises an interface setting device for detecting a common communication format among communication formats available to said first interface of said camera main body and ones available to said first interface of said camera head by communicating data on said available communication formats between said camera main body and said camera head through said second interfaces, and setting said common communication format at both of said first interfaces of said camera main body and said camera head;

wherein said camera head transmits configuration data; and wherein said camera main body processes the image signals based on said configuration data, wherein said camera head and said camera body further comprise storage devices that store specification data of said camera head and said camera main body, and radio communication devices that enable communication between said camera main body and said camera head even while said camera head is packaged, said camera head further comprises a judging device for judging as to whether said camera head is connectable to said camera main body based on the specification data on said camera main body received through said radio communication devices and the specification data of said camera head itself, and sends a judgment of said judging device to said camera main body through said radio communication device, wherein said specification data on said camera main body comprises a camera type number of said camera main body;

wherein said specification data on said camera head comprises a connection data list including camera type numbers connectable to said camera head.

9. A camera system as claimed in claim 8, wherein said first interfaces include one of high-speed serial interfaces and high-speed optical communication interfaces, whereas said second interfaces include 3-line serial interfaces.

10. A camera system as claimed in claim 8, wherein said interface setting device is activated when a power switch of said camera main body is turned on after said camera head is attached to said camera main body.

11. A camera system as claimed in claim 8, wherein setting said common communication format comprises setting a common communication speed.

12. A camera main body that receives and processes image signals produced through an imaging optical system and an imaging device of a camera head that is removably attached to said camera main body, said camera head comprising a first interface for sending the image signals and a second interface for communicating control signals, said first interface establishing communication in one of at least an available communication format, said second interface establishing communication in a fixed communication format, wherein:

said camera main body comprises a first interface for receiving the image signals and a second interface for communicating the control signals, said first interface of said camera main body establishing communication in one of at least an available communication format, said second interface of said camera main body establishing communication in the same fixed communication format as said second interface of said camera head; and said camera main body comprises an interface setting device for detecting a common communication format among communication formats available to said first interface of said camera main body and ones available to said first interface of said camera head by receiving data on said communication formats available to said first interface of said camera head through said second interfaces, and setting said common communication format at both of said first interfaces of said camera main body and said camera head;

wherein said camera head transmits configuration data; and wherein said camera main body processes the image signals based on said configuration data, wherein said camera head on said camera body further comprise storage devices that store specification data of said camera head and said camera main body, and radio communication devices that enable communication between said camera main body and said camera head even while said camera head is packaged, said camera head further comprises a judging device for judging as to whether said camera head is connectable to said camera main body based on the specification data on said camera main body received through said radio communication devices and the specification data of said camera head itself, and sends a judgment of said judging device to said camera main body through said radio communication devices, wherein said specification data on said camera main body comprises a camera type number of said camera main body;

wherein said specification data on said camera head comprises a connection data list including camera type numbers connectable to said camera head.

13. A camera main body as claimed in claim 12, wherein setting said common communication format comprises setting a common communication speed.

14. A camera head that has an imaging optical system and an imaging device for producing image signals, and is removably attached to a camera main body that receives and processes the image signals, said camera main body comprising a first interface for receiving the image signals and a second interface for communicating control signals, said first interface establishing communication in one of at least an available communication format, said second interface establishing communication in a fixed communication format, wherein:

said camera head comprises a first interface for sending the image signals and a second interface for communicating the control signals, said first interface of said camera head establishing communication in one of at least an available communication format, said second interface of said camera head establishing communication in the same fixed communication format as said second interface of said camera main body; and said camera head comprises an interface setting device for detecting a common communication format among communication formats available to said first interface of said camera main body and ones available to said first interface of said camera head by receiving data on said communication formats available to said first interface of said camera main body through said second interfaces, and setting said common communication format at both of said first interfaces of said camera main body and said camera head;

wherein said camera head transmits configuration data; and wherein said camera main body processes the image signals based on said configuration data, wherein said camera head on said camera body further comprise storage devices that store specification data of said camera head and said camera main body, and radio communication devices that enable communication between said camera main body and said camera head even while said camera head is packaged, said camera head further comprises a judging device for judging as to whether said camera head is connectable to said camera main body based on the specification data on said camera main body received through said radio communication devices and the specification data of said camera head itself, and sends a judgment of said judging device to said camera main body through said radio communication devices, wherein said specification data on said camera main body comprises a camera type number of said camera main body;

wherein said specification data on said camera head comprises a connection data list including camera type numbers connectable to said camera head.

15. A camera main body as claimed in claim 14, wherein setting said common communication format comprises setting a common communication speed.

16. A camera system comprising at least a camera main body and interchangeable attachments that work in connection to said camera main body, wherein:

said attachments and said camera main body respectively comprise means for storing specification data, of said attachments and said camera main body, and means for radio communication that enable communication between said camera main body and said attachments even while said attachments are in packages;

each of said attachments comprises a means for judging as to whether said attachment is connectable to said camera main body, based on the specification data on said camera main body received through said means for radio communication and the specification data of said attachment itself, and sends a judgment of said means for judging to said camera main body through said means for radio communication; and said camera main body comprises a means for causing said means for radio communication to start radio communication, and a means for displaying the judgment of said means for judging;

wherein said specification data on said camera main body comprises a camera type number of said camera main body;

wherein said specification data on said attachment comprises a connection data list including camera type numbers connectable to said attachment.

17. A camera system comprising an interchangeable camera head that is provided with an imaging optical system and an imaging device, and at least a camera main body, to which said camera head is removably attached, and which receives and processes image signals produced through said imaging device of said camera head, wherein:

said camera main body comprises a first means for interfacing for receiving the image signals and a second means for interfacing for communicating control signals, said first means for interfacing establishing communication in one of at least an available communication format, said second means for interfacing establishing communication in a fixed communication format;

said camera head comprises a first means for interfacing for sending the image signals and a second means for interfacing for communicating the control signals, said first means for interfacing of said camera head establishing communication in one of at least an available communication format, said second means for interfacing of said camera head establishing communication in the same fixed communication format as said second means for interfacing of said camera main body; and said camera main body or said camera head comprises an interface setting means for detecting a common communication format among communication formats available to said first means for interfacing of said camera main body and ones available to said first means for interfacing of said camera head by communicating data on said available communication formats between said camera main body and said camera head through said second means for interfacing, and setting said common communication format at both of said first means for interfacing of said camera main body and said camera head;

wherein said camera head transmits configuration data; and wherein said camera main body processes the image signals based on said configuration data, wherein said camera head and said camera main body further comprise storage devices that store specification data of said camera head and said camera main body, and radio communication devices that enable communication between said camera main body and said camera head even while said camera head is packaged, said camera head further comprises a judging device for judging as to whether said camera head is connectable to said camera main body based on the specification data on said camera main body received through said radio communication devices and the specification data of said camera head itself, and sends a judgment of said judging device to said camera main body through said radio communication devices, wherein said specification data on said camera main body comprises a camera type number of said camera main body, wherein said specification data on said camera head comprises a connection data list including camera type numbers connectable to said camera head.

* * * * *